US008644802B2

(12) United States Patent
Elkarat et al.

(10) Patent No.: US 8,644,802 B2
(45) Date of Patent: Feb. 4, 2014

(54) TERMINATED CALL CONTROL FOR ROAMING CELLULAR TELEPHONY

(75) Inventors: Shany Elkarat, Tel-Mond (IL); Kobi Fester, Tel-Aviv (IL); Noam Danon, Hod-HaSharon (IL); Shai Dagan, Tel Aviv (IL)

(73) Assignee: StarHome GmbH, Zurich (CH)

( * ) Notice: Subject to any disclaimer, the term of this patent is extended or adjusted under 35 U.S.C. 154(b) by 42 days.

(21) Appl. No.: 12/916,669

(22) Filed: Nov. 1, 2010

(65) Prior Publication Data

US 2011/0045805 A1    Feb. 24, 2011

Related U.S. Application Data

(63) Continuation of application No. 10/987,207, filed on Nov. 15, 2004.

(60) Provisional application No. 60/519,652, filed on Nov. 14, 2003.

(51) Int. Cl.
*H04M 11/10* (2006.01)
(52) U.S. Cl.
USPC .......................................................... 455/413
(58) Field of Classification Search
None
See application file for complete search history.

(56) References Cited

U.S. PATENT DOCUMENTS

| 5,440,614 | A | 8/1995 | Sonberg et al. |
| 5,506,888 | A | 4/1996 | Hayes et al. |
| 5,734,700 | A | 3/1998 | Hauser et al. |
| 6,081,705 | A * | 6/2000 | Houde et al. ................... 455/411 |
| 6,138,007 | A * | 10/2000 | Bharatia ...................... 455/414.1 |
| 6,389,283 | B1 * | 5/2002 | Sanchez Herrero .......... 455/433 |
| 6,615,037 | B1 | 9/2003 | Bharatia et al. |
| 6,684,072 | B1 * | 1/2004 | Anvekar et al. ............. 455/432.1 |
| 6,865,266 | B1 * | 3/2005 | Pershan ................... 379/221.13 |
| 6,996,396 | B1 * | 2/2006 | Snapp ........................... 455/417 |
| 7,181,210 | B2 | 2/2007 | Zabawskyj et al. |
| 7,505,769 | B2 | 3/2009 | Jiang |
| 2002/0068586 | A1 * | 6/2002 | Chun et al. .................... 455/458 |
| 2003/0072425 | A1 * | 4/2003 | Hurst ........................ 379/114.01 |
| 2003/0148755 | A1 | 8/2003 | Bovo et al. |
| 2004/0110489 | A1 | 6/2004 | Murri et al. |

(Continued)

FOREIGN PATENT DOCUMENTS

| EP | 1168856 | 1/2002 |
| EP | 1531647 | 5/2005 |

(Continued)

OTHER PUBLICATIONS

Official Action Dated Jun. 1, 2010 From the US Patent and Trademark Office Re.: U.S. Appl. No. 10/987,207.

(Continued)

*Primary Examiner* — Shantell L Heiber

(57) ABSTRACT

A method, system and gateway for control of calls unanswered by a roaming user roaming on a roaming network, comprises monitoring outward bound calls to roaming users, monitoring subsequent inward forwarding of those calls terminated without answering at said roaming users, and matching between the outward bound and inward forwarding. Matching confers control of processing of the terminated call in two ways. One is that it allows call details, typically lost over International networks, to be obtained regarding the terminated call. Secondly, it allows the originating call to be connected directly to the voicemail or other forwarding destination without involving any International connections.

14 Claims, 18 Drawing Sheets

(56) References Cited

U.S. PATENT DOCUMENTS

| | | |
|---|---|---|
| 2004/0203678 A1 | 10/2004 | MacNamara et al. |
| 2004/0224680 A1 | 11/2004 | Jiang |
| 2005/0070278 A1 | 3/2005 | Jiang |
| 2005/0186950 A1 | 8/2005 | Jiang |
| 2005/0250493 A1 | 11/2005 | Elkarat et al. |
| 2006/0291418 A1 | 12/2006 | Singh |
| 2007/0197213 A1 | 8/2007 | Weintraub et al. |
| 2009/0005037 A1 | 1/2009 | Noldus et al. |

FOREIGN PATENT DOCUMENTS

| | | |
|---|---|---|
| EP | 1555835 | 7/2005 |
| WO | WO 02/19686 | 3/2002 |
| WO | WO 2004/014101 | 2/2004 |
| WO | WO 2004/075484 | 9/2004 |
| WO | WO 2004/075579 | 9/2004 |
| WO | WO 2004/075598 | 9/2004 |
| WO | WO 2005/017693 | 2/2005 |
| WO | WO 2005/018245 | 2/2005 |
| WO | WO 2005/081962 | 9/2005 |
| WO | WO 2005/086927 | 9/2005 |
| WO | WO 2007/074466 | 7/2007 |

OTHER PUBLICATIONS

Official Action Dated Mar. 3, 2009 From the US Patent and Trademark Office Re.: U.S. Appl. No. 10/987,207.
Official Action Dated Dec. 12, 2007 From the US Patent and Trademark Office Re.: U.S. Appl. No. 10/987,207.
Official Action Dated Jun. 16, 2006 From the US Patent and Trademark Office Re.: U.S. Appl. No. 10/987,207.
Official Action Dated Oct. 19, 2007 From the US Patent and Trademark Office Re.: U.S. Appl. No. 10/987,207.
Official Action Dated Nov. 30, 2009 From the US Patent and Trademark Office Re.: U.S. Appl. No. 10/987,207.
Response Dated Feb. 25, 2010 to Official Action of Nov. 30, 2009 From the US Patent and Trademark Office Re.: U.S. Appl. No. 10/987,207.
Communication Pursuant to Article 94(3) EPC Dated Apr. 24, 2008 From the European Patent Office Re.: Application No. 04105774.6.
Communication Relating to the Results of the Partial International Search Dated May 11, 2007 From the International Searching Authority Re.: Application No. PCT/IL2006/001510.
Communiction Pursuant to Article 94(3) EPC Dated Mar. 4, 2009 From the European Patent Office Re.: Application No. 04105774.6.
European Search Report Dated Sep. 20, 2006 From the European Patent Office Re.: Application No. 04105774.6.
International Preliminary Report on Patentability Dated Jul. 10, 2008 From the International Bureau of WIPO Re.: Application No. PCT/IL2006/001510.
International Search Report Dated Aug. 7, 2007 From the International Searching Authority Re.: Application No. PCT/IL2006/001510.
Official Action Dated Sep. 8, 2010 From the US Patent and Trademark Office Re.: U.S. Appl. No. 11/646,324.
Official Action Dated May 21, 2010 From the US Patent and Trademark Office Re.: U.S. Appl. No. 11/646,324.
Official Action Dated Oct. 30, 2009 From the US Patent and Trademark Office Re.: U.S. Appl. No. 11/646,324.
Official Action Dated Jul. 31, 2009 From the US Patent and Trademark Office Re.: U.S. Appl. No. 11/646,324.
Response Dated Oct. 19, 2010 to Official Action of May 21, 2010 and Following the Advisory Action of Sep. 8, 2010 From the US Patent and Trademark Office Re.: U.S. Appl. No. 11/646,324.
Response Dated Aug. 23, 2010 to Official Action of May 21, 2010 From the US Patent and Trademark Office Re.: U.S. Appl. No. 11/646,324.
Response Dated Mar. 25, 2010 to Official Action of Oct. 30, 2009 From the US Patent and Trademark Office Re.: U.S. Appl. No. 11/646,324.
Written Opinion Dated Aug. 7, 2007 From the International Searching Authority Re.: Application No. PCT/IL2006/001510.
Noldius "CAMEL: Intelligent Networks for the GSM, GPRS and UMTS Network", John Wiley & Sons Ltd., p. 206-207, 2006. Providing Documentary Evidence of Common General Knowledge in the field of CAMEL Phase 3. CAMEL Phase 3 Was Frozen in Mar. 2000. 5.2.4 CAMEL Service Invocation at Call Failure.
Communication of a Notice of Opposition Dated Dec. 9, 2010 From the European Patent Office Re. Application No. 04105774.6.
ITU "Series Q: Switching and Signalling: Specifications of Signalling System No. 6", ITU, International Telecommunication Union, ITU-T, Telecommunication Standardization Sector of ITU, Q.251-Q.300, Nov. 1988.
Lagrange et al. "Reseaux Intelligents et CAMEL", Reseaux GSM des Principes à la Norme, HERMES Science Publications, 5e Edition Revue et Augmentée, Annexe 2, 2000.
Communication Pursuant to Article 94(3) EPC Dated Jan. 18, 2011 From the European Patent Office Re. 06832277.5.
Response Dated Jun. 13, 2011 to Communication of Notices of Opposition (Rule 79(1) EPC) of Jan. 13, 2011 From the European Patent Office Re. Application No. 04105774.6.
Response Dated May 29, 2011 to Communication Pursuant to Article 94(3) EPC of Jan. 18, 2011 From the European Patent Office Re. 06832277.5.
Official Action Dated Oct. 26, 2011 From the US Patent and Trademark Office Re.: U.S. Appl. No. 11/646,324.
Summons to Attend Oral Proceedings Pursuant to Rule 115(1) EPC Dated Oct. 5, 2011 From the European Patent Office Re. Application No. 04105774.6.
Communication of Notices of Opposition (Rule 79(1) EPC) Dated Jan. 13, 2011 From the European Patent Office Re. Application No. 04105774.6.
Communication Pursuant to Article 94(3) EPC Dated Mar. 4, 2009 From the European Patent Office Re.: Application No. 04105774.6.
Official Action Dated Jan. 3, 2007 From the US Patent and Trademark Office Re.: U.S. Appl. No. 10/987,207.
Official Action Dated May 21, 2007 From the US Patent and Trademark Office Re.: U.S. Appl. No. 10/987,207.
Official Action Dated Jul. 22, 2008 From the US Patent and Trademark Office Re.: U.S. Appl. No. 10/987,207.
GSM "3rd Generation Partnership Project (3GPP™ ); Technical Specification Group Core Network; Customised Applications for Mobile Network Enhanced Logic (CAMEL) Phase 3—Stage 2 (Release 4)", GSM, Global System for Mobile Communications, 3GPP TS 23.078, V4.10.0, Sep. 2003.
GSM "3rd Generation Partnership Project (3GPP™ ); Technical Specification Group Core Network; Support of Optimal Routeing (SOR); Technical Realization (Release 5)", GSM, Global System for Mobile Communications, 3GPP TS 23.079, V5.3.0, Sep. 2003.
GSM "3rd Generation Partnership Project (3GPP™ ); Technical Specification Group Services and System Aspects; Line Identification Supplementary Services; Stage 1 (Release 5)", GSM, Global System for Mobile Communications, 3GPP TS 22.081, V5.0.0, Jun. 2002.
Lagrange et al. "Reseaux Intelligents et CAMEL", Reseaux GSM des Principes a la Norme, HERMES Science Publications, 5e Edition Revue et Augmentee, Annexe 2, 2000.
Decision Revoking the European Patent (Art. 101(2) EPC) Dated Apr. 10, 2012 From the European Patent Office Re. Application No. 04105774.6.
Notice of Allowance Dated Apr. 11, 2012 From the US Patent and Trademark Office Re.: U.S. Appl. No. 11/646,324.

\* cited by examiner

TERMINATED CALL CONTROL FOR ROAMING CELLULAR TELEPHONY

RELATED APPLICATION/S

This application is a Continuation of U.S. patent application Ser. No. 10/987,207 filed on Nov. 15, 2004, which claims the benefit of U.S. Provisional Patent Application No. 60/519,652 filed on Nov. 14, 2003. The contents of the above Applications are all incorporated herein by reference.

FIELD AND BACKGROUND OF THE INVENTION

The present invention relates to methods, systems and apparatus for terminated call control for roaming cellular telephony.

Systems for supporting mobile telephones when they are outside their home network geographical areas, a phenomenon known as roaming, are well known. Generally a mobile telephone moves within the geographical area of its home network, typically a country, and within that country it moves around different base stations and local visitor location registers (VLRs). When the telephone is outside the geographical region of the network, then it connects to a foreign network, and registers at a roaming VLR. The VLR checks for the corresponding home location register (HLR) to verify the telephone and then allows calls to proceed. The HLR makes a note of the currently responding VLR so that any calls to the telephone can be routed from the HLR to the VLR and the call can be completed.

One phenomenon that occurs with International calls to roamers occurs with call forwarding to mailboxes or to other numbers and is known as tromboning. The calling party calls the roamer who does not answer. The unsuccessful caller is then forwarded from the roamer to the roamer's mailbox where he leaves a message. At this point the calling party is connected via an outgoing international leg to the roamer and then via a second incoming international leg back to the roamer's home network where his voicemail is located. When this happens the calling party pays for a local call, since he dialed a local number. The called party however has to pay for two international legs of the call, all this for a call that he did not even answer. The phenomenon is known as tromboning, and leads to substantial ill feeling and customer care issues with subscribers, so much so that many are induced not to use roaming at all, or at least to cancel their mailboxes whilst roaming, leading to substantial loss of opportunity for further calls.

An additional issue with roaming is that telephone numbers or caller identifications are often lost over international lines, so that the calling number does not appear on the roamer's screen, preventing him from carrying out his own call screening and preventing him from returning calls he was unable to answer.

In more detail, Mobile subscribers normally set call forwarding instructions to the voicemail. Late Call Forwarding is performed conditionally due to the subscriber's inability to answer a call routed to the handset. Conversely, Early Call Forwarding is performed without the network's attempt to route the call to the handset. This happens when the handset is shut off or when the subscriber requests unconditional forwarding of all incoming calls. Late Call Forwarding for busy/no-answer/not-reachable conditions can be configured to any number, usually to the subscriber's voice mailbox.

Mobile subscribers roaming abroad want to stay in touch with work and home, and continue to use their mobile services, such as voicemail. They also naturally want the same user experience as in the home network—such as seamless caller access to mailbox, caller-ID indication in retrieval and direct forwarding of calls to their voice mailbox or to any of their pre-set forwarding destinations.

However, when a roamer cannot take a call—either unavailable, busy or chooses not to answer—the visited network routes the call back to the home voicemail system (the default setting for most roamers). This in turn causes inefficient international tromboning, resulting in a negative impact on the caller and subscriber experience, and forces roamers to pay international tariffs for voicemail deposits.

Reduced Service and Use

Higher subscriber costs—The high cost caused by international tromboning of voicemail causes many roamers to disable voicemail forwarding while roaming or even turn off their handsets. Some home networks just disable call forwarding for their outbound roaming subscribers in order to avoid subscriber frustration.

Complicated use—Due to filtering of signaling data by switch vendors and by some international networks, the original dialed number may not be transferred to the home network's voicemail system, forcing the caller to re-enter the original dialed number. For the same reasons Caller ID is not available to the voicemail system, thus the phone number of the caller is not provided during message retrieval.

Higher operator costs—Roaming subscribers who are unaware of the high cost of forwarding calls may be surprised and angered when receiving their monthly bills. The immediate response is usually to call Customer Care to complain and inquire about the charges. In addition to customer dissatisfaction, this in turn engages operator's manpower and communications resources.

Lost of potential revenue—Disabling call forwarding to voicemail while roaming—either by the subscriber or by the operator—means loss of potential revenue that otherwise would have come from:

Originator call completion
Subscriber voicemail retrieval

FIG. 1 illustrates the double international link known as tromboning that results from attempts to deal with non-completed calls in a roaming environment. A call is made to a user who is currently roaming. The call is initially referred to the user's HLR at his home network 10. The call is then forwarded to the roaming network 12 where the user is currently roaming. The user does not answer and the call is forwarded from the roaming network to the voicemail system 14 on the user's home network 10. The result is a double international connection, or trombone.

There is thus a widely recognized need for, and it would be highly advantageous to have, a terminated call management system for roaming cellular telephony subscribers which is devoid of the above limitations.

SUMMARY OF THE INVENTION

According to one aspect of the present invention there is provided a call management system for unanswered calls to roaming users currently connected in a first, roaming, network, the roaming network being distinct from a home network of the roaming user, the system comprising:

a call tracking unit for tracking calls routed to the roaming user at the roaming network, the call tracking unit having a memory unit for retaining details of the call until the call is either answered or unanswered, and further for tracking calls unanswered and forwarded to a predetermined forwarding location from the roaming network, and a data management unit configured to use the retained details to permit subsequent management of the call within the confines of the home network.

Preferably, the data management unit comprises a matching unit for comparing details of the call being forwarded to the roamer with details of the call being forwarded to the forwarding location, thereby to obtain a match therebetween and obtain respective call details of the call being forwarded to the forwarding location.

The system may further comprise a release unit, associated with the call tracking unit, configured to indicate to the roaming network to release the call.

The system may further comprise a forwarding modification unit for changing forwarding settings of a given user when it is determined that the user is roaming.

Preferably, the memory unit is a loop, for storing the details for a predetermined number of time slots.

The system may comprise a probe, associated with the call tracking unit and the call release unit, for identifying events comprising at least one of a call being forwarded to a roamer and a subsequent event of a call being forwarded to a predetermined forwarding location.

The system may be configured to use network triggers to identify events comprising at least one of a call being forwarded to a respective roamer and a call being forwarded to a predetermined forwarding location.

The system is preferably configured to route a matched call directly to the predetermined forwarding location The system is preferably configured to route a matched call according to preset forwarding rules.

The system may comprise a forwarding modification unit for modifying forwarding settings of given users when they are found to be roaming.

The system's comparator or matching unit is preferably able to compare details of the call being forwarded to the roamer with details of the call being forwarded to the forwarding location, thereby to connect the call being forwarded directly to the forwarding location.

The comparator is preferably able to compare details of the call being forwarded to the roamer with details of the call being forwarded to the forwarding location, thereby to obtain a match therebetween and obtain respective call details of the call being forwarded to the forwarding location.

The system may be configured to send the call details to the forwarding location, the call details comprising caller identity information.

The system may be configured to include the caller identity information in a text message to the roamer.

Preferably, the forwarding location is a voicemail of the roamer.

The system may use different forwarding locations for different circumstances according to any kind of logical scheme, for example it may use a different forwarding location dependent upon a reason for forwarding the call from the roamer to the forwarding location.

The reasons used may include the roaming unit being unavailable to the network, the roaming unit being busy with another call, the roaming unit not answering, and a generic call not completed to the roamer.

In an embodiment, the memory unit is a loop, for storing the details for a predetermined number of time slots.

According to a second aspect of the present invention there is provided a gateway for International roaming at roaming networks distinct from a home network with which the gateway and respective users are associated, the gateway comprising:

a call tracking unit for tracking calls routed to a roaming user at a roaming network, the call tracking unit having a memory unit for retaining details of the call until the call is either answered or unanswered, and further for tracking calls unanswered and forwarded to a predetermined forwarding location from the roaming network, and a call management unit, configured to use the retained details to permit subsequent management of the unanswered call within the confines of the home network.

The gateway may comprise a release unit, associated with the call management unit, configured to indicate to the roaming network to release the forwarded call.

The gateway may comprise a matching unit for matching between a routed call and the forwarding, thereby to obtain the retained information from the routed call for the forwarding.

The gateway may comprise a probe, associated with the call tracking unit and the call release unit, for identifying an event comprising at least one of the call being routed to the roamer and a subsequent event of the call being forwarded to the predetermined forwarding location.

The gateway may comprise a comparator for comparing details of calls being firstly routed to respective roaming users, with details of calls being forwarded to respective forwarding locations, thereby to match the calls and obtain call detail information corresponding to a call being forwarded to the forwarding location.

The gateway may comprise using the call detail information to directly connect the firstly forwarded call to the forwarding location within the confines of the home network.

The gateway may comprise a comparator for comparing details of the call being routed to the roamer with details of the call being forwarded to the forwarding location, thereby to obtain caller identification details of the call being forwarded.

The gateway may be configured to send the caller identification details to the forwarding location.

The gateway may be configured to include the identification details in a text message to the roamer.

The forwarding location may be a voicemail of the roamer, or there could be a number of locations depending on a logical scheme, for example different locations depending on whether the reason for forwarding is any of the roaming unit being unavailable to the network, the roaming unit being busy with another call, the roaming unit not answering, and a generic call not completed to the roamer.

According to a third aspect of the present invention there is provided a method for control of calls terminated without answering at a roaming user roaming on a network apart from a respective home network of the user, the method comprising at the home network, monitoring outward bound calls to roaming users and obtaining data of the outward bound calls, monitoring inward forwarding of the calls unanswered by the roaming users, matching between the outward bound and inward forwarding, thereby to find respective obtained data of the inward forwarded calls and thus confer control of processing of unanswered calls to the home network.

The method may comprise forwarding the matched outward bound call directly to a forwarding location on the home network and issuing a release signal to a respective roaming network.

In an embodiment, the details comprise caller identification information.

The method may comprise forwarding the caller identification information to a predetermined forwarding location.

In an embodiment, the predetermined forwarding location is a voicemail.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
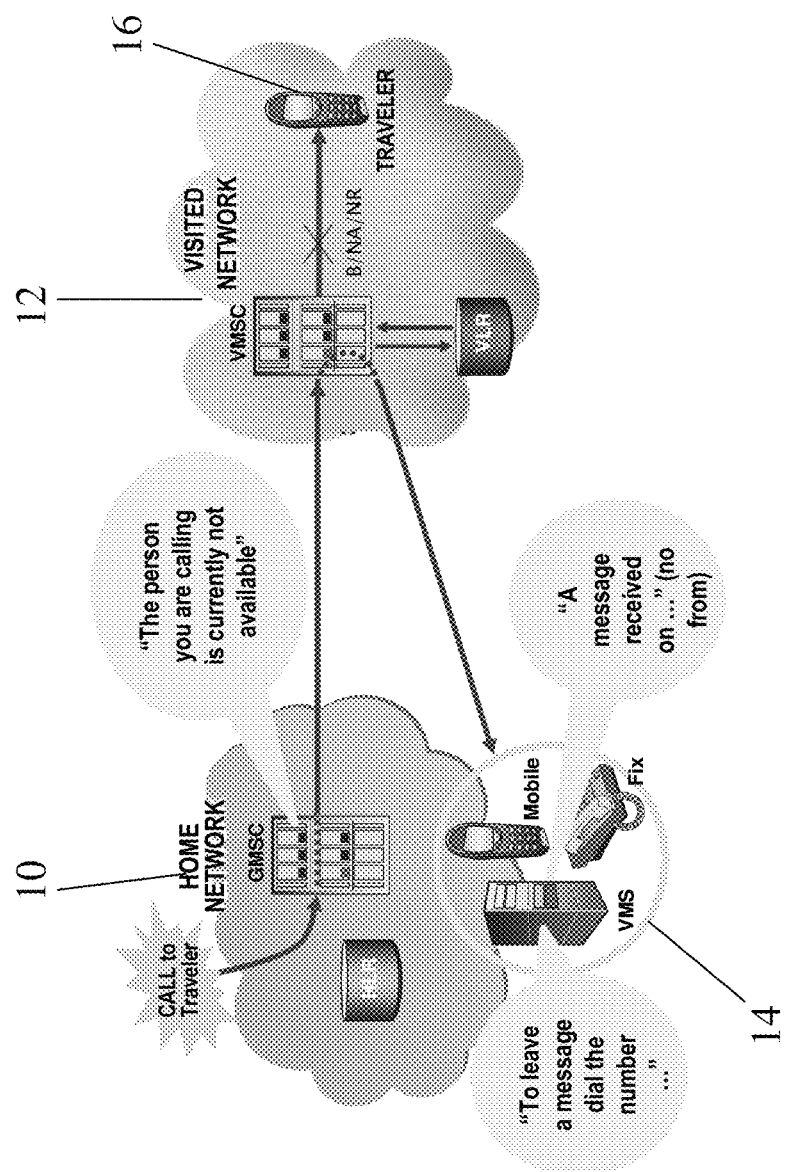
FIG. 1 is a simplified diagram showing how a double international connection or trombone is formed in the currently known art when a call to a roamer is forwarded to his voicemail.

The present embodiments comprise a method for control of calls terminated without answering at a roaming user roaming on a network apart from a respective home network of said user, the method is based on the home network, and involves monitoring outward bound calls to roaming users and obtaining data of said outward bound calls, monitoring inward forwarding of said calls unanswered by said roaming users, and matching between said outward bound and inward forwarding, thereby to find respective obtained data of said inward forwarded calls and thus confer control of processing of unanswered calls to said home network. Matching between outgoing roaming calls and incoming call terminations, allows the International leg of the call can be released and the originating outgoing call can be connected to the voicemail or other forwarding location directly. Furthermore, call detail information, such as caller ID, generally lost over the International connection, can be obtained by the voicemail. If desired the caller ID can be used in a text message to the roamer to inform him that he has a voice mail from the given user ID or that an attempt was made to contact him from that user ID.

Typically the system of the present embodiments is managed at an International gateway of the roamer's home network, referred to hereinbelow as an Intelligent Gateway or by its abbreviations Intelligate or IG.

The principles and operation of an unanswered call control system for roamers according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 2:
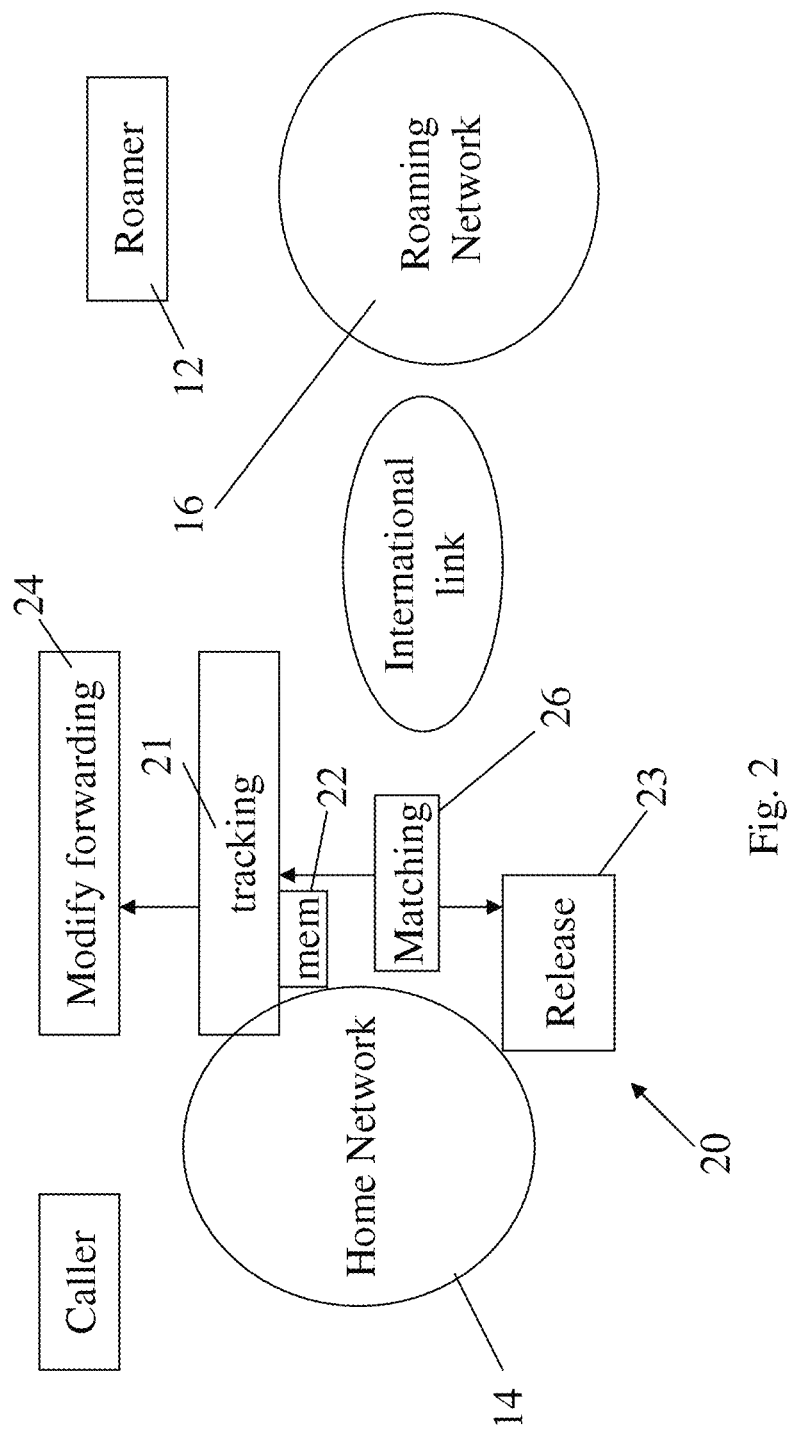
FIG. 2 is a simplified diagram illustrating a generalized embodiment of the present invention.

Reference is now made to FIG. 2, which illustrates an unanswered call management system 20 for calls made to a roaming user 16 currently connected in a, roaming network 12, the roaming network being distinct from his home network 14. The system comprises a tracking unit 21 which tracks international calls for a given network, either via a probe or directly, depending on the kind of network, as will be explained below. A forwarding modification unit 24 modifies forwarding settings for a given roaming user, as will be explained hereinbelow. There is further a memory unit 22 for retaining details of the call until the call is either completed or left unanswered. In addition there is provided a release unit 23, which is in contact with the tracking unit and tells the roaming network that the given call is to be released. However it does not actually tell the home network that the call is to be released. The call in the meantime is typically forwarded from the roaming user to his mailbox or other forwarding number. Such forwarding of the call is common to telephone networks as it connects the failed caller to the voicemail of the called party, or to any other number he might set. The release unit is configured to indicate to the roaming network that the call is released, and to indicate to the call forwarding unit that the initial call is to be forwarded directly to the predetermined forwarding location. That is to say the system detects that the call has become unanswered at the roaming network, finds the originating call, releases the International leg and connects the originating call directly to the forwarding location. This allows for voicemail deposit without tromboning and allows for caller details such as caller ID to be passed on to the voicemail. Furthermore the caller details can be incorporated into a text message and sent to the roamer. Thus the roamer can be informed about unanswered calls and about waiting voicemail deposits.

In one embodiment, memory unit 22 is a loop, for storing said details for a predetermined number of time slots.

An embodiment comprises a probe 116 (see FIG. 3), associated with the call forwarding unit and the call release unit, for identifying said call being forwarded to said roamer and subsequently to said predetermined forwarding location.

Preferably, there is provided a matching unit or comparator 26 for comparing details of the call being forwarded to the roamer (the outbound leg) with details of the call being forwarded to the forwarding location. It thus becomes possible to connect the call being forwarded directly to the forwarding location.

The comparator allows identification details of the call being forwarded to be obtained directly from the call originator.

These identification details can then be sent to the forwarding location, say the roamer's voicemail. Alternatively, or in addition, they may be included in a text message to the roamer.

In some cases the forwarding location may be different dependent upon a reason for forwarding the call. Thus the roamer may want the call forwarded to his voicemail in certain cases but to his office in other cases for example. Reasons for call termination include the roaming unit being unavailable to the network, that is not connected, the roaming unit being busy with another call, the roaming unit simply not answering, and there may be a generic call not completed case, say if the roaming network does not manage to communicate the reason for failed call completion to the roamer.

GENERAL

The Missed Call Notification (MCN) and Optimal Voicemail Deposit (OVMD) for roamers are two services targeting the roaming subscriber (in the GSM world, although the principles may be adopted for the CDMA and TDMA networks). They both rely on the analysis of the MT (Mobile Terminate) calls routed to the roaming network, and specifically on the CLI information (Caller Line Identification). Hence both services share a common technical solution (although the MCN service has an alternative solution as well).

The following embodiments, referred to as Optimal Voicemail Deposit, overcome the problem of international tromboning, which essentially is caused by incomplete signaling when a called party, traveling abroad, cannot answer a call and the call is diverted to the home VMS or to another pre-set forwarding destination.

Optimal Voicemail Deposit improves the caller's experience and significantly reduces the cost of voicemail deposits billed to the roaming subscriber, thereby allowing mobile operators to regain previously lost revenue. The Optimal Voicemail Deposit service provides the following benefits:

Direct forwarding—The actual forwarding to the voice mail or other forwarding destination is carried out within the roamer's home network, No international connections are required.

Home-like user experience—When forwarding the call to the voicemail the application makes the original called number and calling party's number available to the voicemail system. This in turn ensures a positive user experience, both for the subscriber and the caller. As explained, not only is the international tromboning inefficient and expensive, but once the call is forwarded, the original calling party's number has almost certainly been lost, making it difficult to return the call.

Increased call completion rate—Without international call rates, late call forwarding while roaming helps callers to complete more calls and encourages subscribers to activate their voicemail for message deposits, thereby further increasing the call completion rate. This in turn increases the number of voicemail retrieval calls and callbacks.

GLOSSARY

Reference is now made to Table 1, which is a glossary of abbreviations known in the art of mobile telephony and which is used in the following description.

TABLE 1

| Glossary of technical abbreviations | |
|---|---|
| ACM | Address Complete Message |
| ANM | Answer Message |
| BU | Busy |
| CC | Country Code |
| CLI | Calling Line Identification |
| DN | Dialed Number |
| DLCF | Direct Late Call Forwarding |
| ERB | Event Report BCSM |
| FTN | Forward to Number |
| GMSC | Gateway MSC |
| HPMN | Home Public mobile Network |
| IAM | Initial Address Message |
| IDP | Initial Detection Point |

TABLE 1-continued

Glossary of technical abbreviations

| | |
|---|---|
| IMSI | International Mobile Subscriber Identification |
| ISD | Insert Subscriber Data |
| MCN | Missed Call Notification |
| MS | Mobile Station |
| MSRN | Mobile Subscriber Roaming Number |
| NA | No Answer |
| NR | Not Reachable |
| OCN | Original Called Number |
| PRN | Provide Roaming Number |
| REL | Release message |
| RRB | Request Report BCSM |
| SDP | Service Delivery Platform |
| SRI | Supply Routing Information |
| SS | Supplementary Services |
| UL | Update Location |
| VMD | Voicemail Deposit (number) |
| VMSC | Visited MSC |
| VPMN | Visited Public mobile Network |
| CF | Call Forwarding |
| CLIP | Caller Line ID presentation |
| HIA | Host Interface for Administration (Comverse proprietary) |
| ISD | MAP_Insert_Subscriber_Data |
| LU | Location Update |
| MCC | Mobile Country Code |
| MNC | Mobile Network Code |
| MWI | Message Waiting Indicator |
| NDU | Notification Delivery Unit. Who Called application server. |
| RDR | ReDirection Reason. A IAM/ISUP parameter that indication why the call was transferred to the voicemail system. Also used in SNAP protocol |
| SNAP | Simple Notification and Alarming Protocol (pending recognition as industrial standard) - version 3.1 |
| VMS | Voice Mail System |
| WHC | Comverse Who Called |
| WHCfR | Starhome Who Called for Roamers |
| WSE | WHCfR Sends Event |

Optimal Voicemail Deposit

Figure 3:
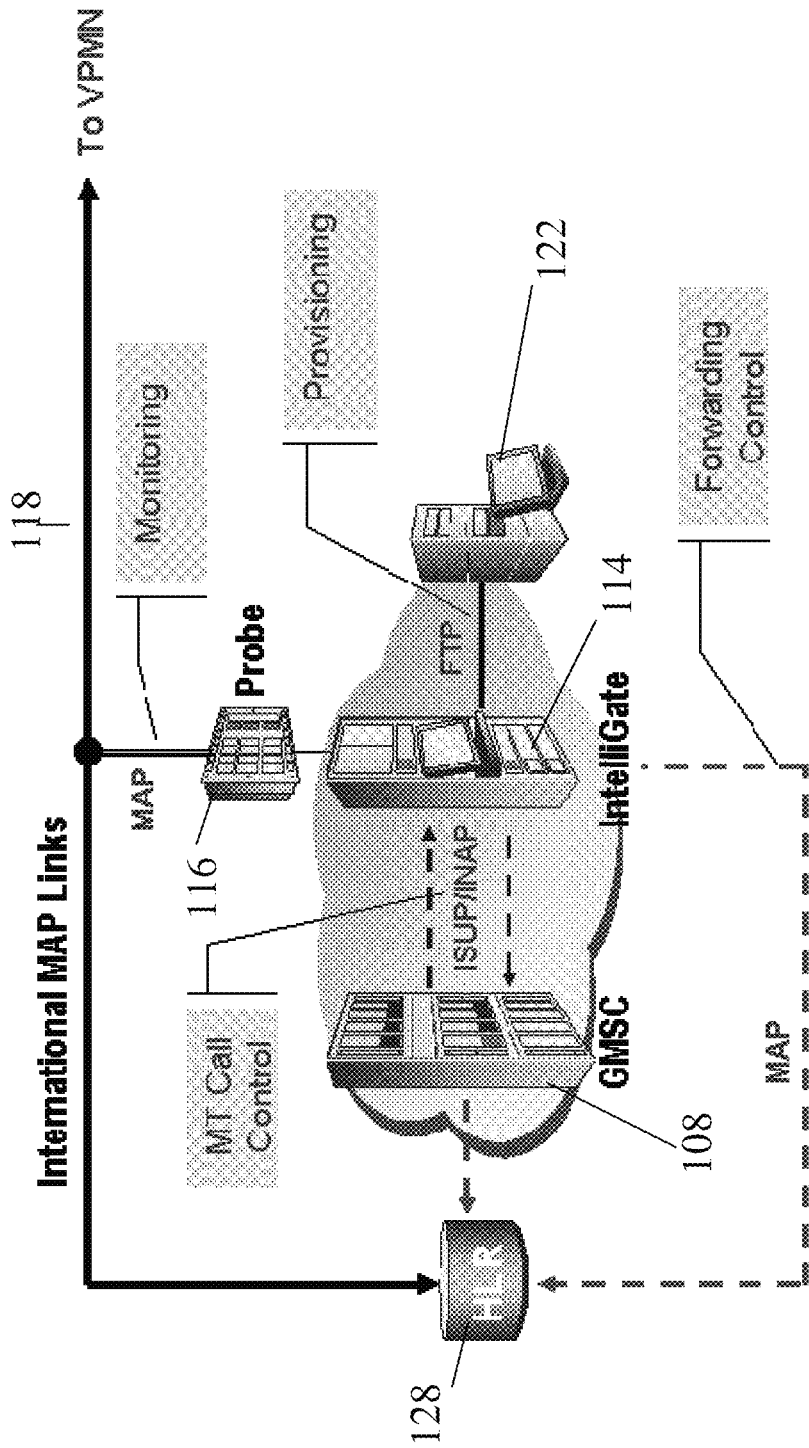
FIG. 3 is a simplified diagram illustrating a version of the embodiment of FIG. 2 based on an International Intelligent gateway and referred to herein as optimal voicemail deposit (OVMD)

Reference is now made to FIG. 3, which is a simplified schematic diagram depicting a preferred embodiment of the present invention referred to herein as Optimal Voicemail Deposit or OVMD. The figure shows the system architecture and interfaces, according to OVMD embodiment of the present invention. In FIG. 3 an Intelligate unit 114 manages roaming connections with external networks. A probe 116 monitors International MAP links 118 and is able to follow calls being set up with roamers, calls to roamers being unanswered and the like. With information from the probe, the Intelligate is able to positively control call forwarding so that International tromboning does not occur. The way in which this controlled call forwarding is carried out depends on the kind of network involved, and a number of different variations are described below.

MSC Interface

The Optimal Voicemail Deposit system based on the IntelliGate Roaming SDP 114 can be integrated with the operator's network via GMSC 120 using one of the following two signaling methods:
Intelligent Network (IN)
ISUP (Service Node)
Based on these two alternative signaling methods, the present embodiments provide a generic technical solution for the service. The final delivered solution to the operator however must be adjusted to the specific network configuration and parameters such as: network size and topology, traffic volume, INAP vendor's variant, CAMEL version if relevant and the operator's preferences, as will be apparent to the person skilled in the art.

Following is a description of the two signaling options.
Intelligent Network (IN)
Based on the typical IN architecture, the IntelliGate unit 114 controls mobile unanswered calls delivered to outbound roaming subscribers. This solution is suitable for networks that are already IN or CAMEL ready and/or networks that experience a relatively high outbound roaming traffic.

Using INAP/CS1 or CAP protocols, call control is performed using a combination of Trigger Detection Points and Event Detection points, as will be explained.
ISUP In particular cases, such as in a non-IN network environment, relatively low outbound roaming traffic, or if preferred by the operator, call control is performed using ISUP signaling. When a call is not completed—meaning the subscriber does not answer or is not available—the IntelliGate 114 directly routes the call to the called party's voicemail system using only HMPN resources, along with the original called number, as if it was a local call in the home network.

In the ISUP case, the IntelliGate is connected to the MSC. Call control does not require connecting the IntelliGate to the network via voice channels. Rather SS7 signaling links are only used to convey ISUP signaling. This inter-connection is achieved by utilizing a Loop-Around technique on the MSC. The loop around technique is now described.

Loop-Around

With Loop-Around, every call requires two ports on the MSC. These ports are connected together to form a loop using a cable so that there is always a voice path between these two ports. The International Intelligent gateway or IntelliGate 114 uses the ISUP signaling for call control to control the looped-around ports using standard ISUP messages.

HLR Interface

Using this interface the IntelliGate controls the forwarding settings of roaming subscribers automatically when registering to a foreign network as well when returning back to the operator's network. Control has mainly to do with deactivating and reactivating the forwarding.

The HLR interface is based on standard SS7/MAP signaling.

It should be noted that in some networks automatic deactivation of the forward to number or FTN for a roamer is done by the network. The IntelliGate unit with the functionality herein described obviates this network feature and thus allows the network provider to provide a complete service.

Probe Interface

The Intelligate is typically provided with an SS7 compatible probe 116 for monitoring SS7 signaling traffic over International links. The probe, known as the SS7 Mobility Probe allows the IntelliGate to have access to the operator's international SCCP signaling links in a completely passive mode.

This interface is used to obtain the relevant subscriber information such as the MSISDN and the forwarding-to-number (FTN).

In some cases the probe and probe interface can be excluded from the final solution, for example when both the following conditions occur:
The network itself provides activation and deactivation of call forwarding The MSISDN of the called party is included in the IDP, this latter being generally true of IN based networks.

Provisioning Interface

The Intelligate is preferably provided with a provisioning interface 122. Provisioning interface 122 allows the management of application parameters and subscriber lists.

For example: the operator allows the provisioning of IMSI/MSISDN numbers of those subscribers who are entitled to use the Optimal Voicemail Deposit service (white list). The same interface can be used to block the service for pre-paid users or certain user groups (block list).

Processing Stages

Figure 4:
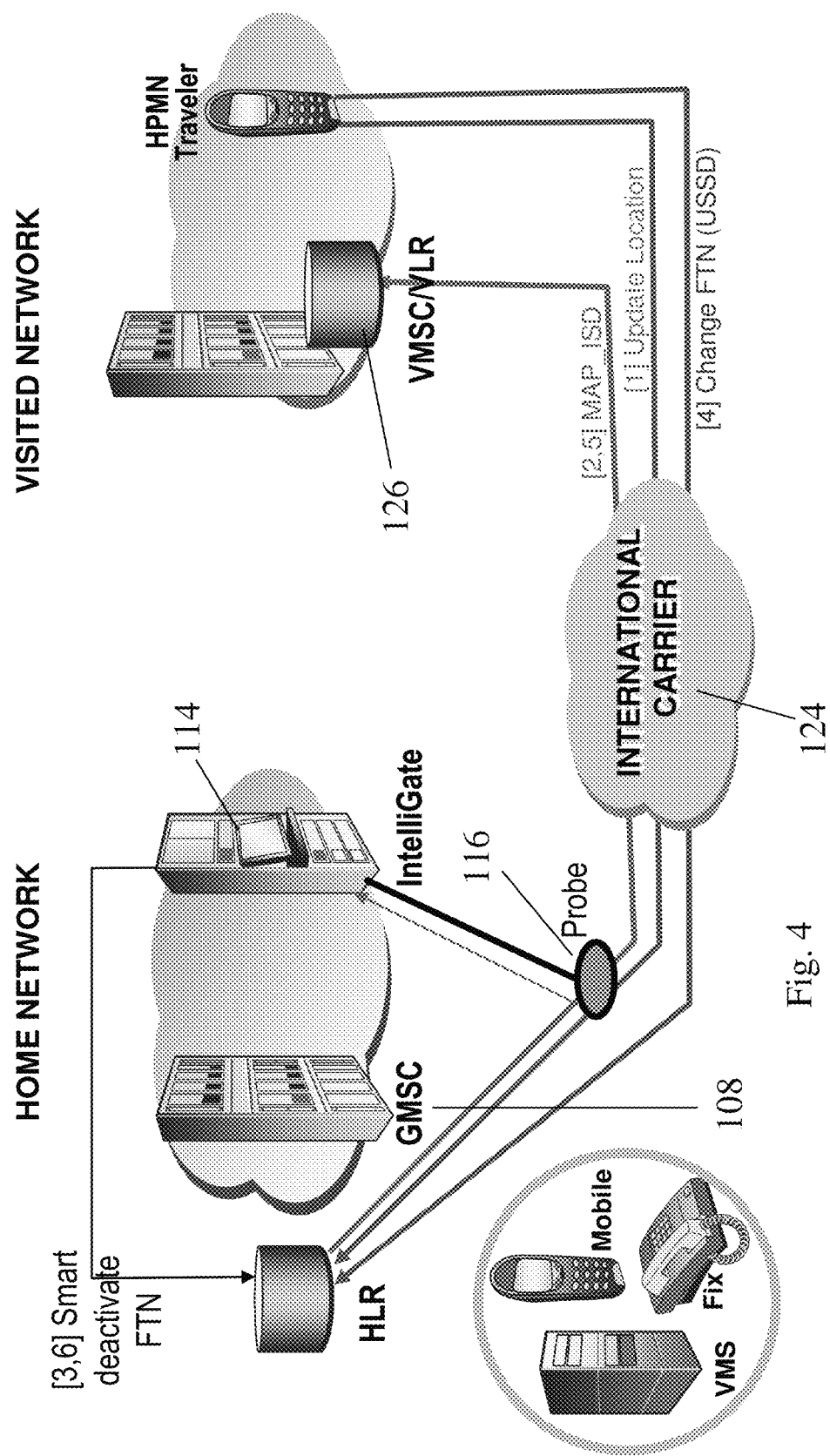
FIG. 4 is a simplified diagram illustrating message flow processes over a system similar to that shown in FIG. 3 for an unanswered call.

Reference is now made to FIG. 4, which illustrates the message flow in the various stages of forwarding an unanswered call. As will be appreciated the process of forwarding an unanswered call according to the present embodiments begins before the call to the roamer is left unanswered. A first stage is the service initial stage, which is now described.

Service Initial Stage—Obtaining Roamer's Information

The service initial process refers to non call-related processing. This process includes three main activities:

Obtaining subscriber information
Deactivating subscriber's forwarding (if needed)
Monitoring subscriber-initiated forwarding changes (if needed)

The following figure depicts the service initial stage and is referred to in the paragraphs below:

Obtaining Subscriber's Information

Using its Mobility Probe 116, the IntelliGate 114 automatically detects a registration event of any outbound roamer belonging to the current network. By monitoring the registration messages such as MAP UpdateLocation and MAP_ISD, the IntelliGate 114 collects the information necessary for the application such as the correlation of the IMSI to MSISDN and the configured FTN's. The system supports both optimal call forwarding to any number or call forwarding only to voicemail. The correlation between IMSI and MSISDN is not required when forwarding to voicemail.

By analyzing the FTN profile, the IntelliGate can understand the subscriber's profile. Based on the forwarding profile we can categorize the subscribers into "default" subscribers and "advanced" subscribers. If the subscriber has requested a different FTN for different cases then the subscriber's profile is considered "advanced". If all cases are forwarded to the voicemail or disabled then the subscriber's profile considered "default".

It should be noted that forwarding calls to different destinations based on the release cause is possible only if the release cause is available (returned) to the home GMSC; the system handles exceptions by routing to a default destination. This point is discussed in more detail below.

Check CF in the HLR Directly

Some networks automatically disable call forwarding for roamers; in this case the OVMD service can automatically "learn" the original CF profile of the subscriber and act accordingly. The service uses MAP_INTERROGATE_SS or MAP_SRI requests to the HLR to retrieve the CF information. The information retrieved is used to determine whether or not call forwarding is enabled for the subscriber.

The decision to check the HLR is configured and provisioned in the IntelliGate 114 according to the presently preferred embodiments.

Deactivating Subscriber's Forwarding

Once a successful registration is detected, the IntelliGate 114 sends, if configured (when the network doesn't disable FTN automatically), a MAP_Deactivate_SS message to the HLR and thereby is able to avoid international forwarding from the VPMN to HPMN during roaming.

The deactivation is preferably according to the following rules based on FTN values:

1. If the requested FTN is domestic then it is preferably deactivated in order to provide optimal routing to the requested destination, 2. If the requested FTN is international it is preferably left unchanged, as the user knows it is an international number with associated costs, 3. Deactivate FTN for Busy and No Reply (Not Reachable shall remain without change).

Monitoring for Subscriber-Initiated Forwarding Changes

After the initial stage the system preferably checks for any changes in the forwarding information by the subscriber or Customer Care. Both changes appear in a MAP_ISD sent to the serving VLR. The message is preferably monitored and the system may act to reinstate the required changes for the subscriber in order to provide the service according to the following rules, based on the subscriber's requested forward to number, FTN.

1. If the requested FTN is domestic then it should be deactivated it in order to provide optimal route to the destination.

2. If the requested FTN is international it should be left unchanged, for the user knows it is an international number with the cost consequences.

Call Control Stage 1—Outgoing Phase

This is the first call related phase in which the GMSC 108 receives an MT call destined to an outbound roamer. The GMSC, after interrogating the HLR and receiving the MSRN, grants call control to the IntelliGate 114 using INAP or ISUP as appropriate. The main difference between ISUP and IN signaling is the availability of the original called number, i.e. the roamer's MSISDN. The GMSC itself normally does not provide that number in an outgoing call to an international destination, only the MSRN is used for routing. With IN protocols it is anticipated that the OCN is provided as part of the IN query sent by the MSC/SSP.

The present embodiments provide a solution for the missing MT MSISDN based on monitoring the MAP signaling as described below. Alternatively the operator may wish to acquire a solution from its MSC vendor.

Once granted control over the call, the IntelliGate 114 routes the call via the GMSC 108 and the international carrier 124 to VPMN 126 at the roamer's current location. The visited serving MSC tries to extend the call to the roamer. The roamer may not answer for any of the three reasons—no reply, busy and not reachable.

Call Control Stage 2—Forwarding Phase

In this stage the IntelliGate 114 offers two scenarios which can be configured for the convenience of the network operator.

FTN Disabled in HLR

If the subscriber FTN profile has previously been disabled in the HLR 128, say via an HLR Interface, prior to controlling the call, then the visited MSC/VLR has no active forwarding information and therefore releases the call.

Once the IntelliGate 114 receives the release signal from the visited MSC, it forwards the call via the GMSC to the pre-configured FTN which will in many cases be the VMS. The IntelliGate will make the caller's CLI and the roamer's MSISDN available to the VMS.

For DLCF function, if the IntelliGate receives a meaningful release cause it preferably forwards the call according to the value to the FTN indicated in the profile for that release cause.

FTN Profile not Changed

On subscriber Busy, No Answer or Not Reachable, the VMSC forwards the call to the requested FTN. If the requested FTN is the voicemail, in fact the usual default, then the call is routed back to the HPMN.

The H-GMSC is configured to route forwarded calls arriving from foreign networks and having specific DNs (=Voicemail deposit) to the IntelliGate.

Once the IntelliGate receives the forwarded call, then the call itself is released. This, in turn, causes the originally routed call to be released. That is to say the double international leg or trombone is released. Upon receiving this release the IntelliGate routes the originator's call via the GMSC to the pre-configured FTN, which is in most cases, the VMS. The IntelliGate then makes available the caller's CLI and the roamer's MSISDN to the VMS.

Default Forward DN for Other Release Cause

Some networks may not receive the release cause from the international links, say Busy, etc. In this case the release caused received is changed to a default or common cause, for example: NORMAL UNSPECIFIED.

The default case is handled in 3 levels:

1. If all FTNs of that given subscriber point to the Voicemail—then automatically forward the call to the Voicemail 2. If one of the FTN is the Voicemail—forward to Voicemail 3. If no Voicemail number is found in the FTN—release the call, or at the preference of the operator, forward to another FTN.

Service Final Stage—Reactivating Subscriber's Forwarding

Firstly it is pointed out that if the HLR reactivates the subscriber's FTN automatically when returning to the home network, then this stage is not active.

The Optimal Voicemail Deposit service ensures that once the roamer returns to its HPMN the original forwarding settings are reactivated. This is done by monitoring the MAP_CANCEL message on the international signaling links. Per each detected CANCEL message the time interval between this event and the prior MAP_ISD event is measured. If this time is longer than a pre-defined time parameter then the IntelliGate queries the HLR using the MAP_SRI_SM message to obtain the address of the roamer's serving MSC/VLR. If the MSC/VLR's address belongs to HPMN's network than it is concluded that the roamer has returned to the home network. In this case the IntelliGate sends a MAP_Activate_SS message to the HLR.

If the MSC/VLR's address is still a foreign one (a different VPMN) than the application must have received a previous MAP_ISD message for the new VPMN. This message confirms that the subscriber is still roaming but in a new VPMN.

Networks which have deactivated call forwarding automatically on roaming (by the HLR, without the IntelliGate's intervention) typically have to reactivate the original call forwarding when the subscriber returns home.

IN-Based Call Flow

Figure 5:
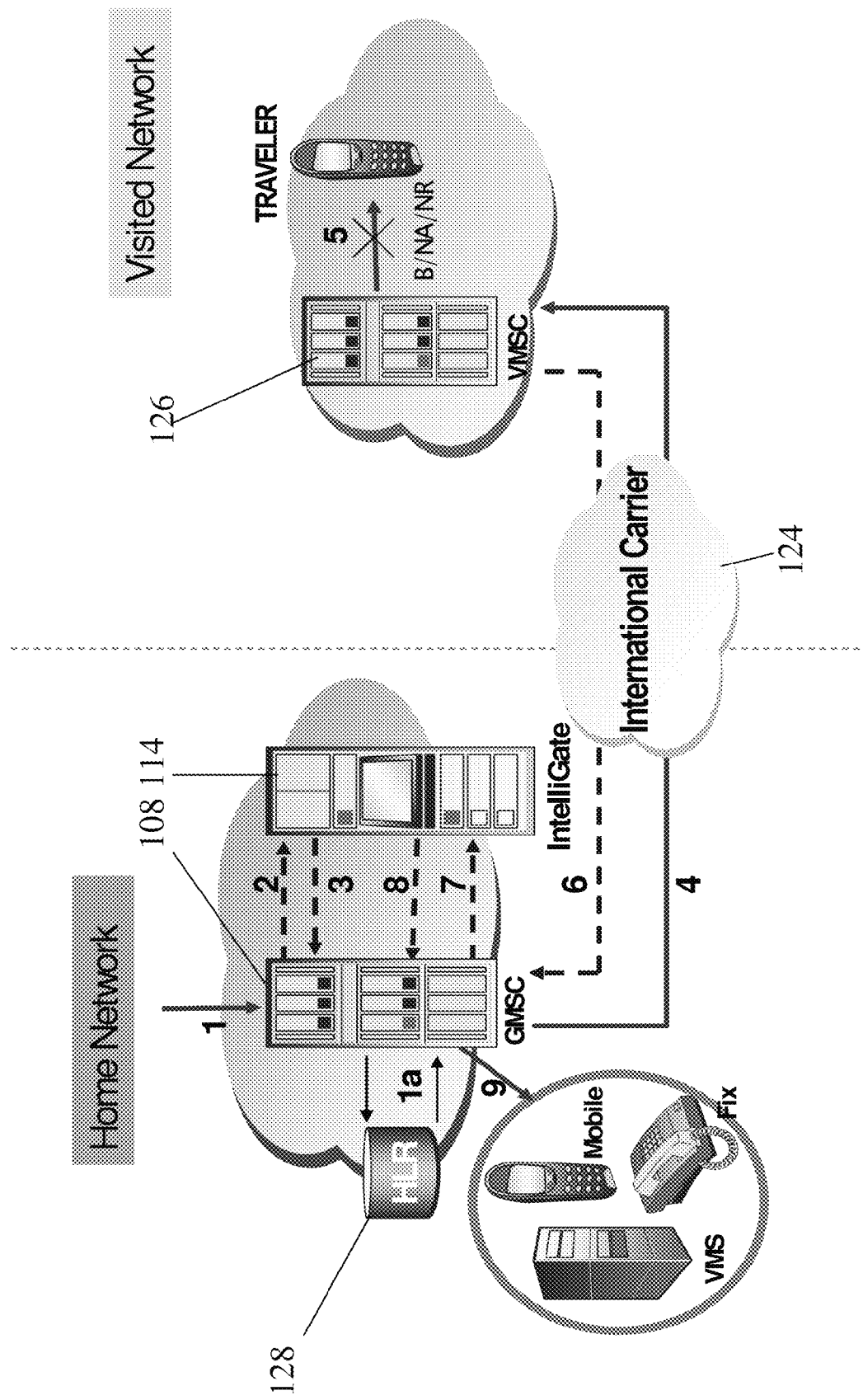
FIG. 5 is a simplified diagram illustrating a different flow process over a system similar to that shown in FIG. 3.

Reference is now made to FIG. 5, which depicts the call flow for the Optimal Voicemail Deposit based on IN architecture. Parts that are the same as in previous figures are given the same reference numerals and are not referred to again except as necessary for understanding the present embodiment. The IN protocol can be INAP CS-1 or CAP (for CAMEL enabled subscribers having an associated T-CSI record). The probe is typically not required. The generic call flow is presented below in Table 2, with stage numbers referring to FIG. 5. The generic call flow may be customized to Operator's specifications.

TABLE 2

IN-based Call Flow for Not Reachable (CFNRC)

| | |
|---|---|
| NOTE: | Prior to the call flow Late Call Forwarding (Busy and No Reply) has been deactivated in the HLR (by IntelliGate or network). |
| Step 1 | A mobile terminated (MT) call arrives to the operator's-GMSC. |
| Step 1a | The GMSC interrogates the HLR for routing information (MAP_SRI). |
| Step 2 | The foreign VLR-address arms a Trigger Detection Point causing the GMSC to send an IDP [CLI, MSRN, MSISDN(optional), IMSI(optional)] to the IntelliGate. |
| Step 3 | The IntelliGate processes the request and sends to the GMSC Connect [MSRN] and RRB messages. Other control signals such as for charging support may be sent upon the operator's requirements. |
| Step 4 | The GMSC arms an Event Detection Point for the call and routes the call to the VPMN. |
| Step 5 | The VMSC attempts to route the call to the destination MS. The call is not answered. |
| Step 6 | The VMSC releases the call with a corresponding release cause (no CF). Note: in case the roamer is not reachable (NoReachable) the call is redirected back to the HPMN. The H-GMSC is preconfigured to redirect incoming calls to VMS DN to the IntelliGate, which releases the calls (eliminating the trombone) and redirects locally to the VM. |
| Step 7 | The GMSC sends an ERB message to the IntelliGate reporting about the call release. |
| Step 8 | The IntelliGate sends a Connect [CLI DN = VMS, OCN* = MSISDN] message. * Or any other field. |
| Step 9 | The GMSC routes the call to the VMS system. |

Because the same forward-to-number is used when the subscriber is not reachable for both Early Call Forwarding and Late Call Forwarding, disabling the FTN while roaming might prevent voicemail activation for Early Call Forwarding (e.g. handset is off).

To avoid loss of traffic to voicemail with Early Call Forwarding it is advisable not to disable CFNRC and allow trombone. If the CFNRC is directed to the Voicemail the GMSC is preferably configured to send an additional trigger to the IntelliGate to allow the Optimal Voicemail Deposit service to release the call, and thereby release the trombone. The trombone release causes a release in the first call leg that instructs the service to redirect the call to the voicemail, locally.

Figure 6:
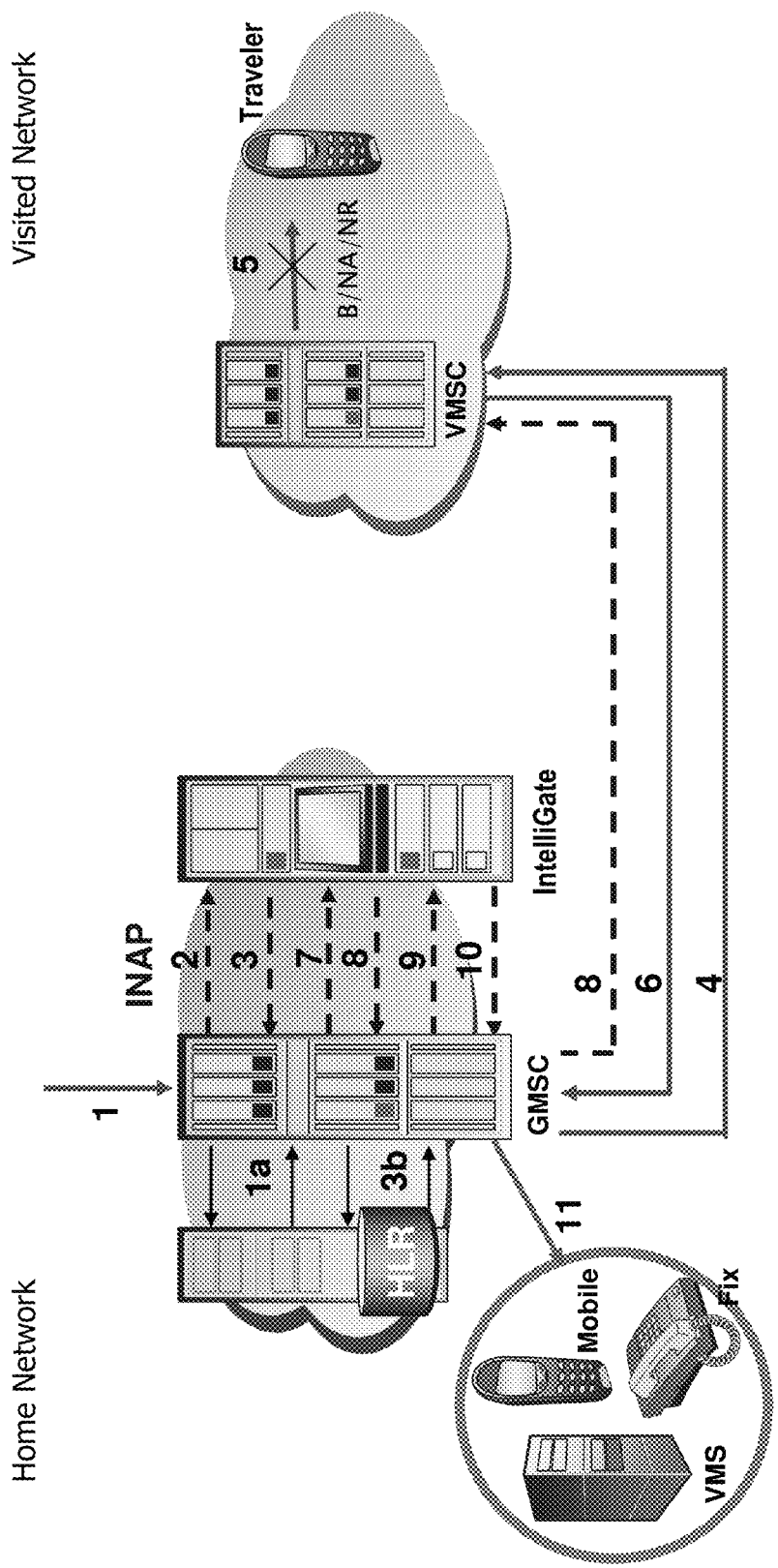
FIG. 6 is a simplified diagram illustrating yet a further flow process over a system similar to that shown in FIG. 3.

Reference is now made to FIG. 6 which is a simplified diagram illustrating IN-based Call Flow without CFNRC Deactivation. Parts that are the same as in previous figures are given the same reference numerals and are not referred to again except as necessary for understanding the present embodiment. The numbers in the figure refer to Table 3 below which describes the procedure.

TABLE 3

IN-based Call Flow without CFNRC Deactivation

| | |
|---|---|
| Step 1 | A mobile terminated (MT) call arrives to the operator's GMSC. |
| Step 1a | The GMSC interrogates the HLR for routing information (MAP_SRI). |

TABLE 3-continued

IN-based Call Flow without CFNRC Deactivation

| | |
|---|---|
| Step 1b | The HLR interrogates the serving VLR using the MAP_PRN message and returns a MSRN to the IntelliGate. |
| Step 2 | The foreign VLR-address arms a Trigger Detection Point causing the GMSC to send an IDP [CLI, MSRN, MSISDN, IMSI] to the IntelliGate. |
| Step 3 | The IntelliGate processes the request and sends to the GMSC Continue [MSRN] and RRB message. Other control signals such as for charging support may be sent upon the operator's requirements. |
| Step 4 | The GMSC arms an Event Detection Point for the call and routes the call to the VPMN. |
| Step 5 | The VMSC attempts to route the call to the destination MS. The subscriber is temporary not reachable. |
| Step 6 | The VMSC forwards the call back to the HPMN (DN = FTN). |
| Step 7 | The GMSC verifies that the DN = FTN = VMS and sends IDP to the IntelliGate. |
| Step 8 | The IntelliGate releases the forwarded call causing a release on leg 3. |
| Step 9 | The GMSC sends an ERB message to the IntelliGate reporting about the call release. |
| Step 10 | The IntelliGate sends a Connect [CLI DN = VMS, OCN* = MSISDN] message.<br>* Or any other field. |
| Step 11 | The GMSC routes the call to the VMS system. |

Handling Pre-Paid Users

Although operators might wish to offer the Optimal Voicemail Deposit service to both post-paid and pre-paid users, the pre-paid system architecture introduces technical challenge to the flow of the service. The reason is that the pre-paid system is always the first to process the call. When the Optimal Voicemail Deposit processes the call after the pre-paid system the call, although answered by the local VMS, appears to the pre-paid system as if the roamer was the one who answered. This in turn causes the pre-paid user to pay one international leg for VM deposit.

The present embodiments offer several solutions targeted for different network constellations and vendors. However if the operator prefers to block pre-paid users from the service altogether then it can provision the application with either of the two:

1. A 'White List' of all users entitled for the service
2. The IMSI ranges of the pre-paid users to be blocked Summary Optimal Voicemail Deposit service offers operators the following benefits:
  Eliminates international legs and tromboning—bypasses international leg for voicemail, significantly reducing costs to the subscriber
  Optimized Voicemail for Roaming—encourages use of mobile phone and voicemail in particular by optimizing the user experience and significantly reducing costs for voicemail deposit
  Direct Late Call Forwarding enables the optimization of late call forwarding to any number (not only Voicemail), allowing advanced users to have their call routed optimally to any domestic destination The method described up to now involves interfacing directly with the HLR, and sending a command modifying the forwarding information.

Alternatives for Changing Call Forwarding

Figure 7:
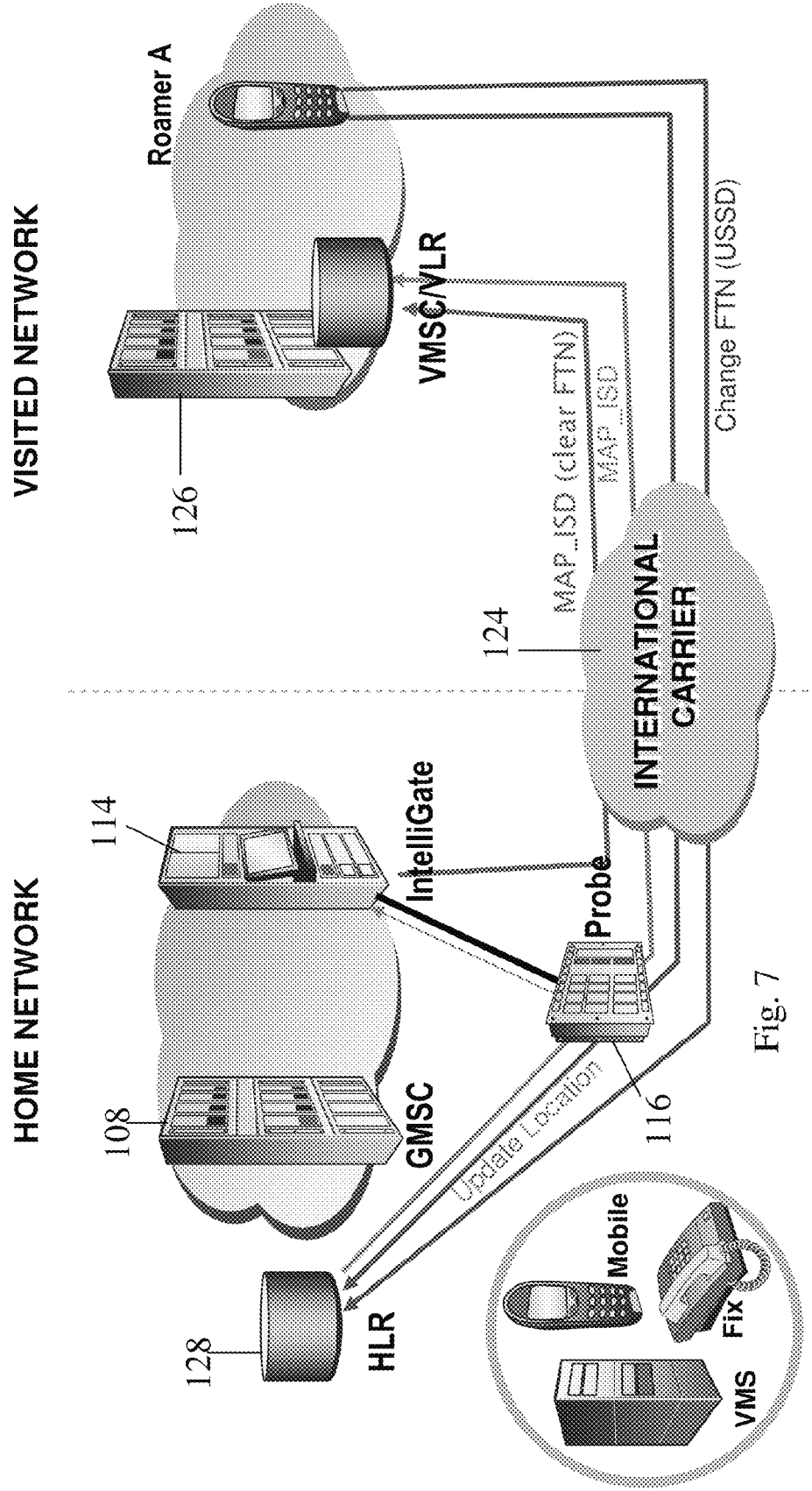
FIG. 7 is a simplified diagram illustrating a flow process for deactivating a previously set forward to number over a system similar to that shown in FIG. 3.

Returning to OVMD in general and it is possible to send a second ISD message to the VLR, for modifying any forwarding information the roamer currently has. For this step, there are 3 alternatives, as described in the following three embodiments:

1. Reference is now made to FIG. 7, which illustrates an embodiment that teaches sending an additional ISD (Insert Subscriber Data message) to the serving VLR, overriding the previous ISD sent by the HLR. Such an additional ISD message preferably modifies the forwarding information at the serving VLR only, not touching the HLR.

Figure 8:
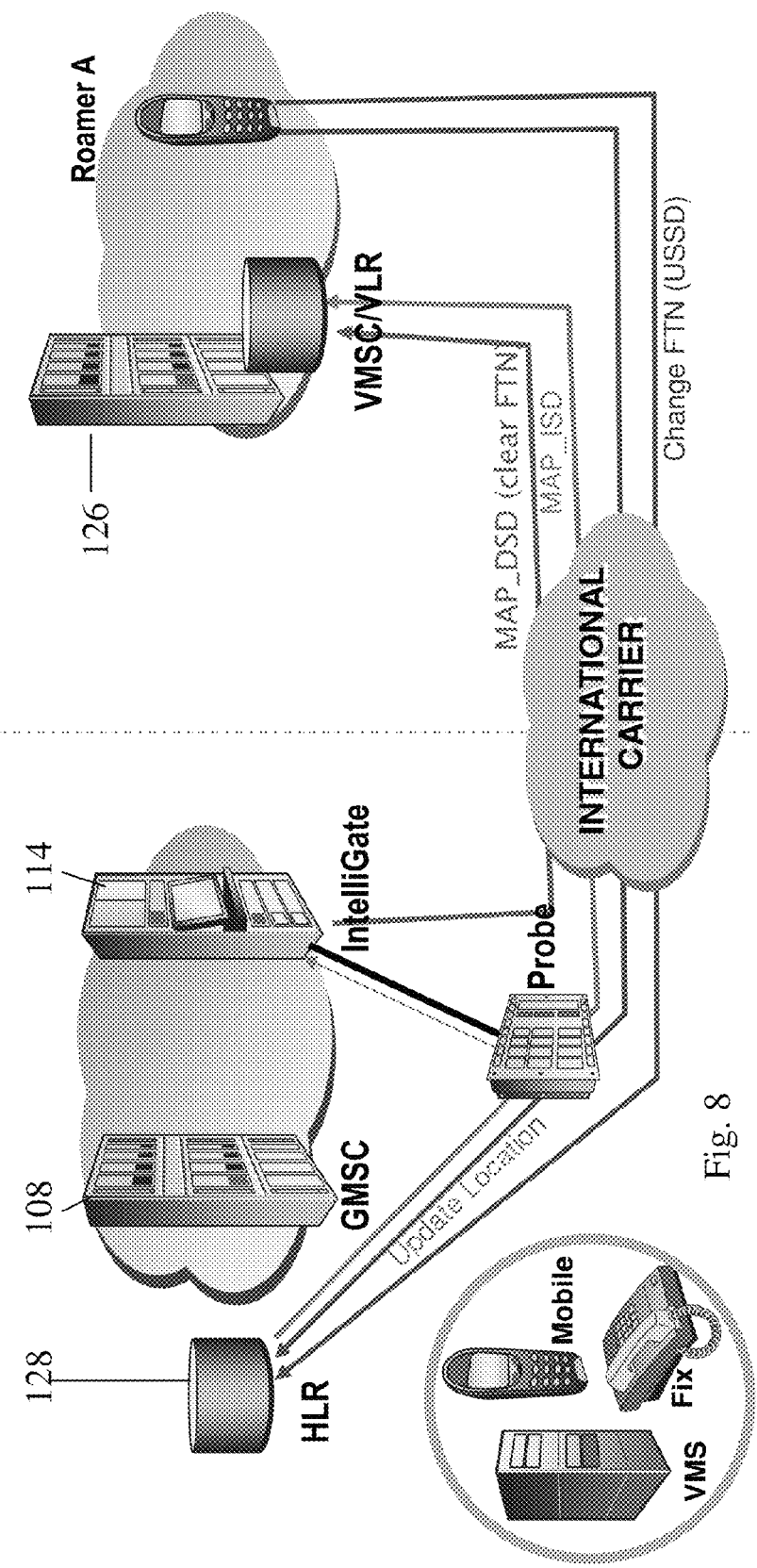
FIG. 8 is a simplified diagram illustrating an alternative flow process for deactivation of a previously set forward to number over a system similar to that shown in FIG. 3.

2. Reference is now made to FIG. 8, which illustrates an embodiment that teaches sending of a DSD to the serving VLR, the DSD being a "Delete Subscriber Information" instruction, with which it is possible to delete the forwarding information only. This is an improvement on the above system, since it is not necessary to send a new ISD message. The skilled person will be aware that the ISD message is a somewhat large message, containing the full profile of the subscriber.

Figure 9:
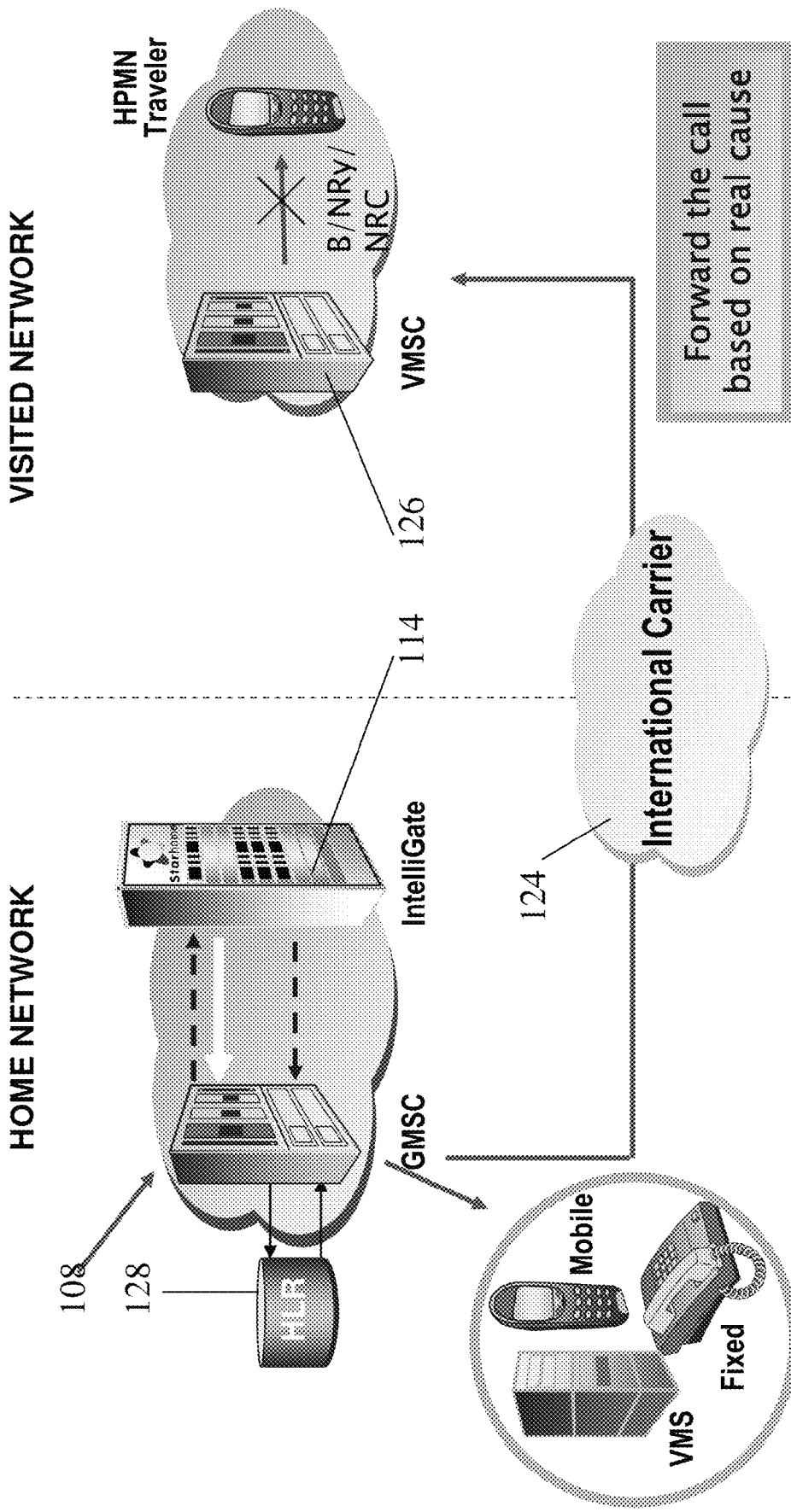
FIG. 9 is a simplified diagram illustrating the process involved in forwarding a call based on a cause given at the roaming network.

3. Reference is now made to FIG. 9 which illustrates an embodiment that uses an SRM (Signaling Relay Module), as described hereinabove. With the use of the SRM, it is possible to modify an original ISD sent by the HLR back to the VLR, as a response to the Location Update message. This way, the forwarding information may be modified at the original ISD message, and there is no longer any need for an additional ISD or DSD.

However the installation of an SRM is itself complicated, and therefore the SRM embodiment is preferably retained for cases in which an SRM is already installed on site.

Signaling Relay Module

First of all it is desirable to say a few words about the signaling relay module, or SRM. An SRM is a signaling platform that is connected to the SS7 telephone signaling network at a given point. When connected it controls the SS7 traffic, generally consisting of GSM MAP messages, at that point, with the ability to modify signaling transactions or relay them with no modification. The SRM can be used to implement some of the optimal voicemail deposit embodiments that will be described below.

There are two methods for integrating a signaling relay into the network: (a) transparently, as shown in FIG. 10, and (b) as a service node as shown in FIG. 11.

Figure 10:
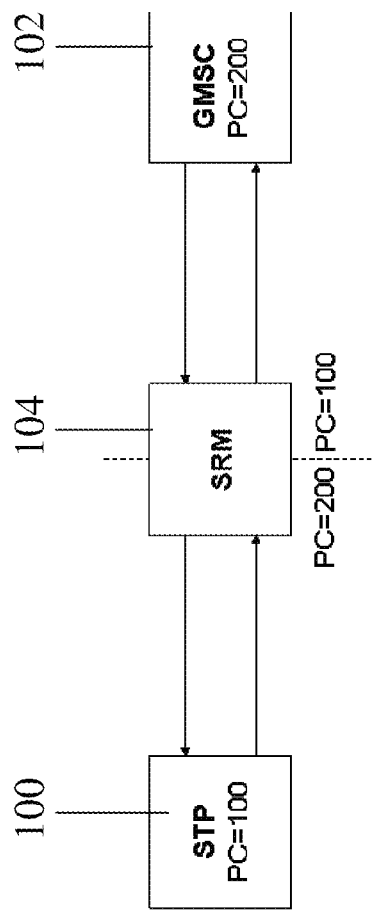
FIG. 10 is a simplified diagram illustrating a first preferred connection configuration for a signaling relay module according to one preferred embodiment of the present invention.

The transparent option, illustrated in FIG. 10, does not change the network structure at all, and therefore is transparent to the network.

In FIG. 10, STP 100 and GMSC 102 were connected directly to each other before SRM 104 was plugged into the network. After SRM 104 is added, the STP and GMSC do not feel any change, each one sees the SRM, as it was the previous component they worked with.

Figure 11:
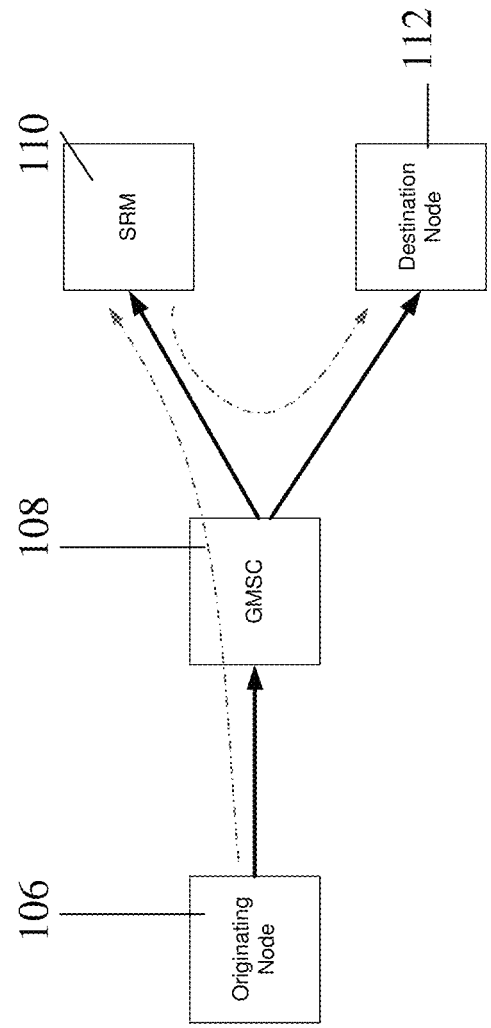
FIG. 11 is a simplified diagram illustrating a second preferred connection configuration for a signaling relay module according to one preferred embodiment of the present invention.

With reference now to FIG. 11, the service node option (b) requires some routing modifications to the network, since it introduces a new entity to the network.

In the service node method, an originating node 106 originates a transaction, which passes initially to GMSC 108. Transactions reaching the GMSC 108 are now either routed via a first branch to SRM 110 by the GMSC, or via a second branch to destination mode 112. Transactions diverted to the SRM 110 instead of to the destination node 112 may later be routed later by the SRM to the destination node.

The above-described embodiments deal with the issue of obviating the trombone. In the following the issue of transferring call control data such as the telephone number of the calling party is considered in greater detail.

Missed Calls

Background

It is the intention of the present embodiments to provide roamers with the same caller identification capabilities that exist in domestic networks. When a roamer receives a call, the CLI in most cases is lost on the way, thus resulting in an unidentified call. If the call was not answered then the handset displays a missed call notification without a CLI or with a meaningless CLI (i.e. "0001200").

Roamers without voicemail have no other way of retrieving the caller ID for missed calls, only by receiving Who Called for Roamers SMS notification.

Figure 12:
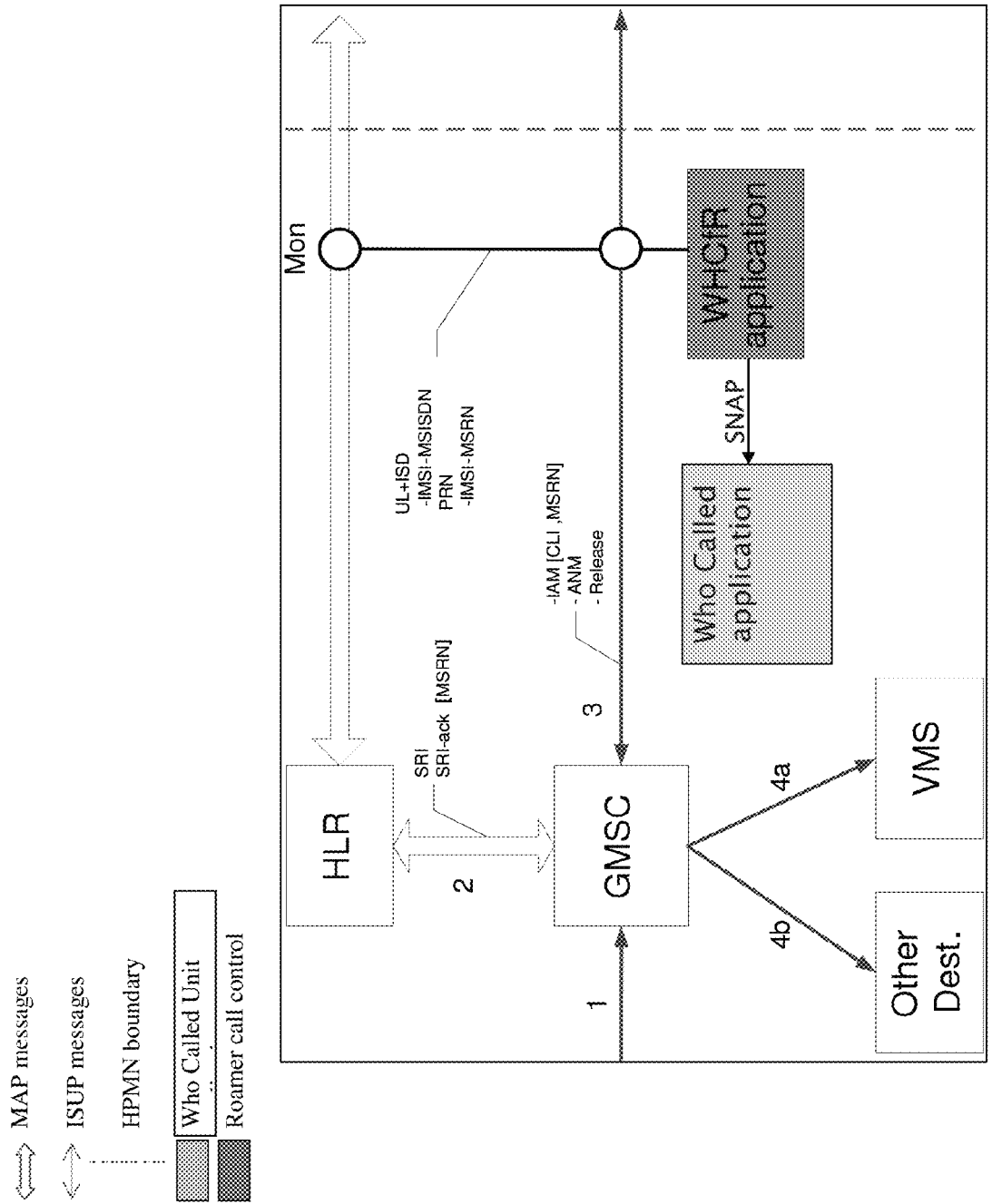
FIG. 12 is a simplified configuration diagram showing how an application to identify callers to roaming users can be used in conjunction with a network local application to identify callers to local users.

Reference is now made to FIG. 12, which is a simplified diagram showing the message exchange of a system for identifying an unanswered call to a roamer using a probe. The messaging stages are numbered and are discussed in table 5, below.

TABLE 5

Handling Procedure at WHCfR for missed call notification

| Step 1 | A mobile terminated (MT) call arrives at the GMSC. |
|---|---|
| Step 2 | The GMSC interrogates the HLR for routing information (MAP_SRI). |
| Step 2a | The HLR interrogates the serving VLR (MAP_PRN) and receives the MSRN (MAP_PRN_ack). The Probe captures these messages, thus providing the WHCfR application with the IMSI-MSRN assignment |
| Step 3 | The MSRN that indicates a foreign VPMN causes the GMSC to send an IAM [CLI, DN = MSRN] to the V-MSC. The Probe captures the message, providing the WHCfR application with the CLI, MSRN |
| Step 3a | The WHCfR handles the cases as described below |
| Step 4 | The WHCfR application initiates missed call notification to B number. |
| Step 4a | In case the user has requested to forward his calls to VMS |
| Step 4b | In case the user has requested to forward his calls to a different number. |

Service Flow

As shown in FIG. 12, in use, the probes monitor the incoming and outgoing international ISUP and MAP links for certain signals. For the ISUP case the signals are: IAM, SAM, ACM, ANM, REL, RLC. For the MAP case these are: MAP_PRN (+ack), MAP_ISD (+ack), MAP_Update_Location, MAP_CANCEL.

The WHCfR application preferably identifies the user location changes, and creates a mapping of MSISDN ⇔ IMSI ⇔ MSRN in order to track outgoing calls and subsequent forwarding of the calls. The probes look for correlations between the outgoing and incoming calls.

Any correlation between MSISDN ⇔ IMSI ⇔ MSRN is preferably saved until a MAP_CANCEL message is detected to the V-VLR (a new MSRN is assigned for the roamer). The mapping shall be persistent during service restart (upgrade, fault recovery, shutdown, etc.).

Every unanswered call (REL without ANM) may then be defined as a WHCfR event. The unanswered call may be any of No Reply (no answer), Unreachable (page fault), and Busy.

The WHCfR can then monitor both outgoing and incoming calls on the international link to try and find a correlation with the calls that where forwarded back to the home network (to the Voicemail or to WHC local).

If a correlation is found it means that the voicemail or WHC local system can handle the Who Called notification and no WHCfR action is needed.

The decision whether to send a notification or not may be made by matching of the information elements of table 6 in the ISUP messages:

TABLE 6

ISUP Elements for matching

| Outgoing Call to roamer | Incoming Call from roamer (call forwarding) | Remarks |
|---|---|---|
| CLI | CLI | Same CLI in both directions |
|  | DN (VM or WHC) | Only redirected calls to the VM or WHC shall be handled. VM access number which is formulated (algorithm based) is out of scope of this MRD and shall be handled as a customization feature. |
| Roamers DN | OCN | The mailbox owner is sent in the OCN field |
|  | RDR (Busy or Not Reachable) | WHC local system deals only with cases of busy and not reachable. No Answer is not handled by WHC local, thus shall be handled by WHCfR. |

Preferably, there is provided an option not to send WHCfR events for specific destinations in dependence on the release cause, thus No Reply, Busy, Unreachable, or in accordance with other factors such as Mobile Country Code and Mobile Network Code or any combination of the above. Such an option may prevent double notification for destinations with guaranteed CLI delivery.

It is noted in this context that although CLIP is available with several operators, in the Busy and Unreachable situations, the handset doesn't display the missed calls in any event. Specifically these cases makes WHCfR valuable.

WHCfR events are typically reported to the WHC application server over SNAP.

The WHCfR preferably passes the following fields (via SNAP) to WHC application:
1. Roaming indication (in RDR field, refer to SNAP IDD)
2. MCC, MNC
3. CLI
4. MSISDN The WHCfR application may use calling or A party CLIR information. Furthermore if the A party has its CLIR set to restricted—no WHCfR event is preferably issued.

Calls that have been answered by a network prompt (ANM with NO CHARGE indication) from the visited network are preferably considered as NOT answered calls and a WHCfR event is preferably sent.

If an ANM is received without any charging indication then the event is treated as a normal ANM with charge.

In some cases an ISUP RELease message may not contain the actual release cause but a generic value. Such a case has been discussed above and need not limit the behavior of the WHCfR system.

In case of a failure (IP host by name, HTTP request, etc. . . . ) in sending a WHCfR event the WHCfR application typically retries sending. Retry logic is set by a SNAP_NUMBER_OF_RETRIES parameter and a SNAP_RETRY_INTERVAL parameter.

Service Limitations

Figure 13:
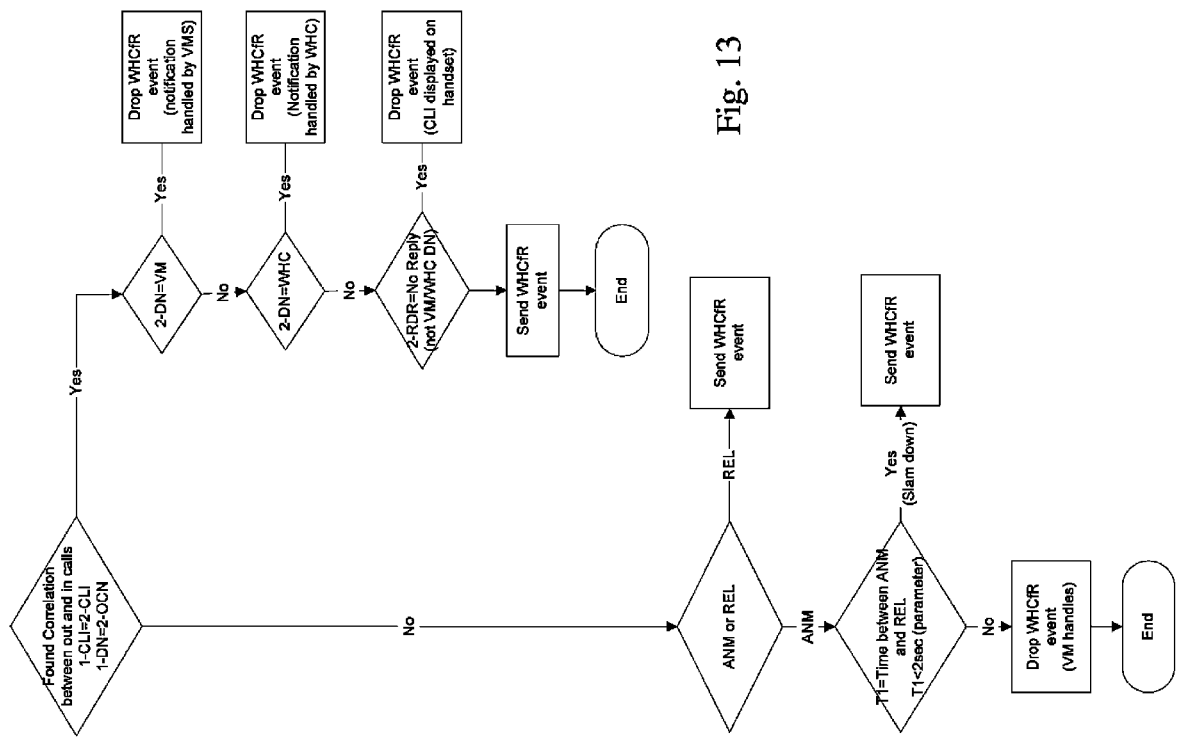
FIG. 13 is a simplified flow chart illustrating a preferred procedure for identifying a calling party to a roaming user according to an embodiment of the present invention.

Reference is now made to FIG. 13 which is a simplified flow chart that illustrates the logic flow of the above-described service.

Following are the service limitations where handling extreme cases:

One limitation is that the WHCfR is liable to send a notification even if the call actually was answered by the called or B party, but with very short duration.

This case, known as a slam down, can happen due to lack of out/in call correlation, because the decision as to whether there is a "slam down" is based on a Timer (T1).

In cases of a short conversation WHCfR may decide that it is dealing with a slam down without correlation and send an event even though the B party has answered and did not actually miss the call.

Another limitation is that no WHCfR event may be triggered if the Voicemail Deposit lacks a CLI.

There may be cases where a voicemail is deposited but the voicemail notification has no caller ID. In such a case the WHCfR is not aware of the voicemail deposits being made and hence cannot react to the CLI deposits scenarios. In such a case no WHCfR notification is made.

Network Types and Protocols

The system is for use without restriction to the kind of networks. Nevertheless the present embodiments especially concentrate on the network types given in Table 7, in order of priority:

TABLE 7

| | network types to be supported in order or priority | | |
|---|---|---|---|
| | Capability | Ph. | Prio. |
| 1 | GSM over ITU | 1 | 1 |
| 2 | GSM over ANSI | TBD | 2 |
| 3 | Proprietary SS7 formats (British, Japanese etc.) | TBD | 2 |

Traffic Assumptions

Because the system monitors all outgoing calls to roamers, the termination reason does not change the traffic capacity for the system.

Percentage of connected subscribers that roam concurrently: 5%

Number of mobile unanswered calls: 2 calls/roamer

Number of busy hours per day: 10 BH/Day

For Example: On a 5,000,000 subscribers' network the traffic calculation is: $5,000,000 \times 5\% \times 2/10 = 50,000$ BHCA per system.

Missed Call Notification (MCN) Service Description

As caller-ID is not available in most cases while roaming, roaming subscribers tend to either shut off the handset or not to answer calls (or at least some of the calls) especially when they are engaged in e.g. business meeting. For example, handsets may be shut off due to different time-zones (roamer is sleeping)

Such a situation causes loss of revenue to the HPMN operator in all cases and to the VPMN operator in some cases, assuming that Optimal Routing is not implemented.

MCN can partially solve this problem: roamers who do not answer calls are able to receive an SMS with the details of the calling party and therefore will try to get in contact with those who they want to.

MCN is becoming very popular in the local market. One example of such a product for the local market is the Comverse Who Called service. Note that in the local market the only applicable case is the handset-off case since caller-ID (CLI) is available to an open handset. That is to say, as long as the telephone was switched on at the time the call was received, the calling number is saved for future reference. If the telephone was not switched on then an SMS arriving later with the details is valuable. However in the International context, the caller ID is rarely passed on, and thus even if the roamer's phone was switched on at the time, a subsequently received SMS with the caller details would be helpful.

Missed Call Notification is thus a valuable service for outbound roaming subscribers. If the phone is off/busy or the traveler simply does not answer a call, the application automatically sends an SMS to the roamer indicating the missed call event along with its details: caller ID, time and date of call.

With better control of incoming calls, roamers are more likely to return calls or send SMS messages, thus increasing network traffic and operator revenues.

Such a missed call notification may be provided as a default to all outbound roamers. However, some operators may wish to provide it on a subscription based approach.

Missed Call Notification (MCN) Service Flow
Handset-On Case

The MCN preferably detects an un-answered mobile terminated call to an outbound roamer, in any of the ways outlined in the preceding embodiments.

If the MSC supplies the B-party's MSISDN then the MSISDN can be used as the address to send the SMS.

If the MSC does not supply the MSISDN then the MSISDN has to be obtained using other means, for example real-time probing as with the OVMD embodiment above.

Upon detection of an un-answered call the missed call notification or MCN involves the following:

If the roamer has no forwarding settings or has forwarding to a non-voicemail forward-to number, then it is possible to send the MCN with caller-ID (CLI), date and time of call. In lower priority it is possible to send details of the FTN and forwarding operation, such as "Call was forwarded to +97254123456".

If the roamer has forwarding settings to the VMS then rules may be applied as follows:

If the VMS sends an SMS-based voicemail notification within X time, do not send an MCN.

If the VMS does not send voicemail notification within X time, then send an MCN.

The skilled person will also wish to support the case of no call forwarding.

Handset-Off Case

The MCN preferably incorporates detection of a mobile terminated call to an outbound roamer that was either forwarded to an FTN (e.g. a voicemail service) in the HPMN or released due to non forwarding settings by the called party.

Upon detection of the forwarded call the MCN involves the following:

If the roamer has no forwarding settings or has forwarding to a non-voicemail forward to number, the system sends an MCN with caller-ID (CLI), date and time of call. In lower priority it also sends details of the FTN, thus "Call was forwarded to +97254123456".

Rules such as the following may be applied.

If the roamer has forwarding settings to the VMS then either:
1) If the VMS sends SMS-based VM notification within X time, don't send an MCN; or
2) If the VMS does not send a VM notification within X time, send an MCN.

Missed Call Notification (MCN) Technical Solutions

There are 2 preferred solutions to implement an MCN service:
  MCN service when no OVMD infrastructure is valid, hereinbelow, solution #1
  MCN service implemented based on an OVMD infrastructure, hereinbelow solution #2.

Missed Call Notification (MCN) Solution #1

Solution Architecture

This solution is based on a combination of MAP & ISUP monitoring and an active HLR modification process.
  Probing: Probing is provided for subscribers who have no call forward or whose recent call forward (CF) settings have been disabled by the operator while roaming.
  HLR Modification for late call forwarding: This is provided for subscribers who activate late call forwarding while roaming. In this case the HLR modification provides an integrated solution.
  HLR Modification for early call forwarding: This can also be provided for states of early call forwarding. Early call forwarding is the kind of call forwarding when the called party is not connected to the network.

Probing Solution when Late CD is Disabled/not Active

In this case the probes are sufficient to provide solution.

Flow

Figure 14:
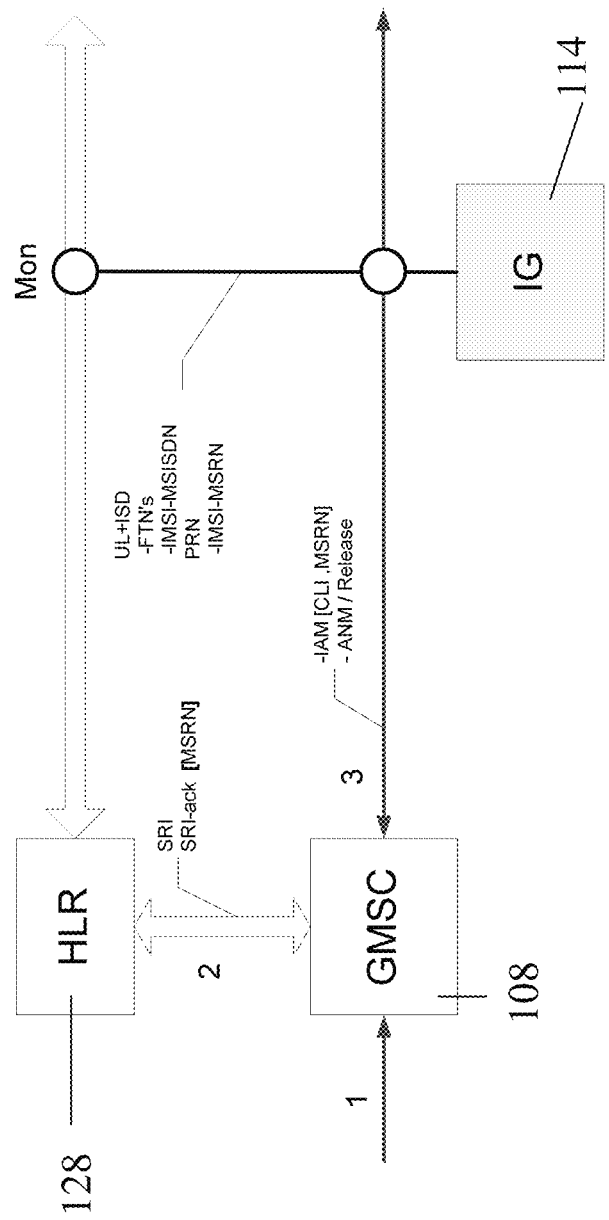
FIG. 14 is a simplified schematic diagram illustrating the call flow in the case of the call being terminated following no answer at the roaming device.

Reference is now made to FIG. 14, which is a simplified schematic diagram illustrating the call flow in the case of the call being terminated following no answer at the roaming device. The stages are set out in table 8 below.

TABLE 8

| | Call flow in case of No Answer at the roamer |
|---|---|
| Step 1 | A mobile terminated (MT) call arrives at GMSC 108. |
| Step 2 | The GMSC interrogates the HLR 128 for routing information (MAP_SRI). |
| Step 2a | The HLR interrogates the serving VLR (MAP_PRN) and receives the MSRN (MAP_PRN_ack). The Probe captures these messages providing the IntelliGate with the IMSI-MSRN assignment |
| Step 3 | The MSRN, which indicates a foreign VPMN, causes the GMSC to send IAM [CLI, DN = MSRN] to the V-MSC. The Probe captures these messages providing the IntelliGate the CLI, MSRN |
| Step 3a | In case of a timeout event a release may be sent back to the GMSC at HPMN. The Probe captures this release which identifies an end of session. |
| Step 4 | The I/G initiates an MCN to B number (called party) |

HLR Modification when Late & Early CF are Active

HLR Modification

In the case of HLR modification, the international gateway (I/G), using call control server (CCS), changes the call forwarding conditions in the HLR as follows:

In the case in which all FTNs are identical the numbers are changed to one DID. In this case MT & MF calls are routed to the I/G, which now controls the session.

In the case in which the FTNs are different, the I/G assigns a unique DID per case (i.e. Busy, No Answer etc.). This allows identification of the reason for forwarding the call.

Late CF Flow

Figure 15:
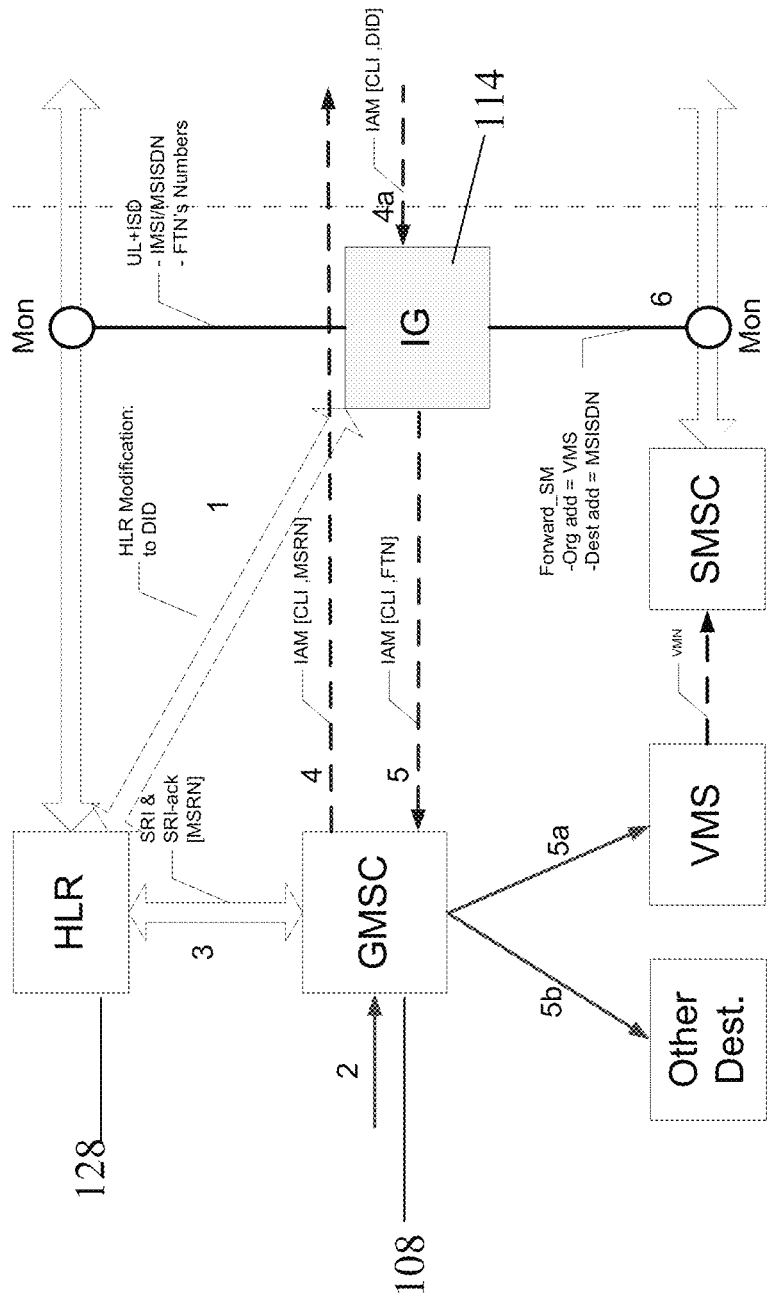
FIG. 15 is a simplified diagram illustrating call flow for late call forwarding cases.

Reference is now made to FIG. 15, which illustrates call flow for late call forwarding cases. The signaling stages illustrated are described in table 9 below.

TABLE 9

| | Late forwarding CF control |
|---|---|
| Step 1 | I/G 150 changes the FTN addresses to DID |
| Step 2 | A mobile terminated (MT) call arrives to the GMSC 108. |
| Step 3 | The GMSC interrogates the HLR 108 for routing information (MAP_SRI). The HLR returns with the MSRN |
| Step 4 | The MSRN, which indicates a foreign VPMN, causes the GMSC to send IAM [CLI, DN = MSRN] to the V-MSC. |
| Step 4a | In case of a timeout event a forwarding event occurs and an outgoing MF-IAM is sent from the V-MSC to the I/G DID |
| Step 5 | The I/G analyses (based on DID) if call was forwarded. |
| Step 5a | In case DID = other destination than VMS, the I/G connects the call and initiates MCN |
| Step 5b | In case DID = VMS the I/G connects the call and initiates timer |
| Step 6 | In case no MT SMS was submitted from the VMS as notification, the I/G initiates MCN. |

Early CF Flow

Figure 16:
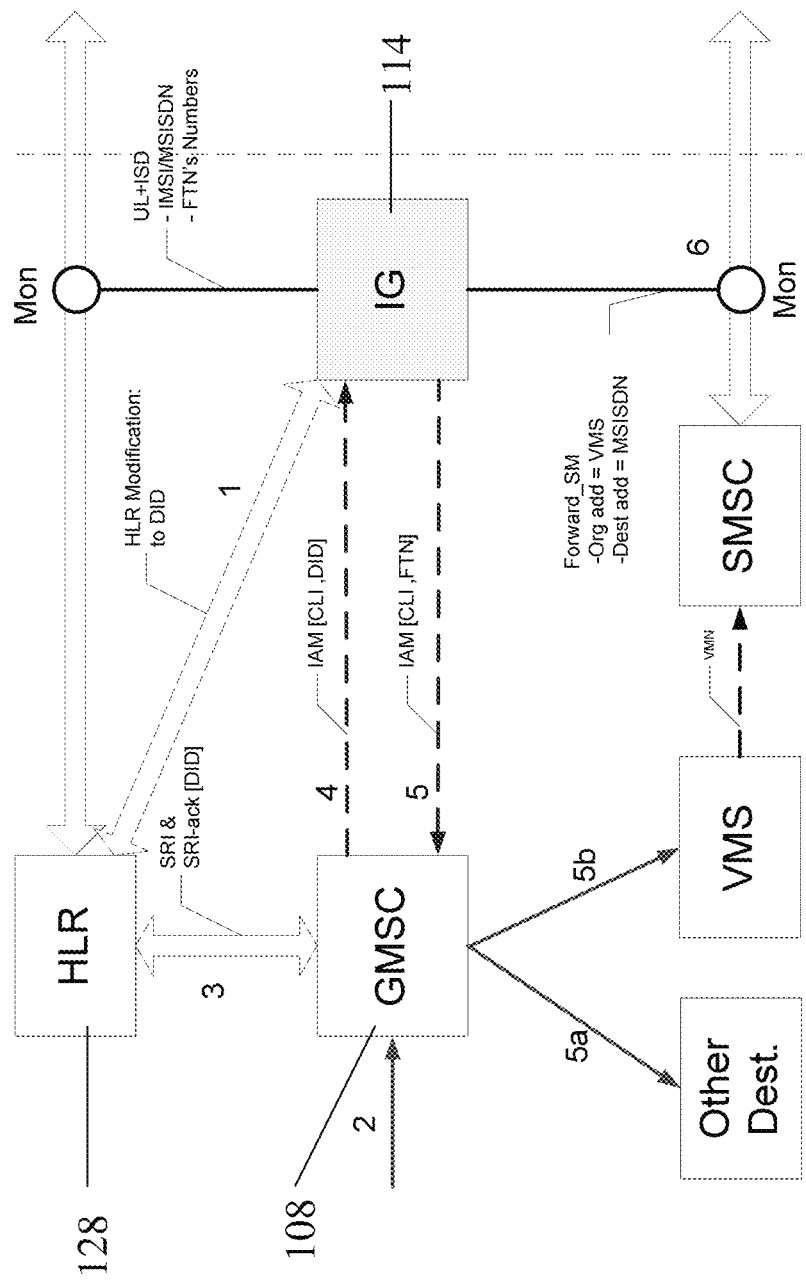
FIG. 16 is a simplified diagram illustrating call flow for early call forwarding cases.

Reference is now made to FIG. 16, which shows call flow for early call forwarding cases. The procedure is described in table 10.

TABLE 10

| | Signaling procedure for early call forwarding |
|---|---|
| Step 1 | I/G 150 changes the FTN addresses to DID |
| Step 2 | A mobile terminated (MT) call arrives at GMSC 108. |
| Step 3 | GMSC 108 interrogates HLR 128 for routing information (MAP_SRI). The HLR returns with DID |
| Step 4 | GMSC 108 sends IAM [CLI, DN = DID] to I/G 150. |
| Step 5a | In case DID = other destination than VMS, I/G 150 connects the call and initiates MCN |
| Step 5b | In case DID = VMS, I/G 150 connects the call and initiates timer |
| Step 6 | In case of no MT SMS being submitted from VMS as notification, I/G 150 initiates MCN. |

Missed Call Notification (MCN) Solution #2

Based on OVMD

Solution Architecture

This second solution is based on an additional valid OVMD infrastructure already implemented at the operator's network. In addition an HLR modification process is added to provide a complete solution. The OVMD in the present solution allows late call forwarding CF and missed call notification MCN in addition to optimal routing. The HLR Modification also allows early call forwarding and missed call notification.

OVMD Solution when Late Call Forwarding is Activated

This solution uses the OVMD infrastructure to control missed calls to subscribers while roaming, and hereinbelow we explain the MCN interaction regardless of OVMD optimization.

HLR Modification Solution when Early CF is Activated

HLR Modification

In this case the I/G 150, using call control server (CCS), changes the CF conditions in the HLR as follows:
In the case of all FTNs beings identical the numbers are changed to a single DID. In this case MT & MF calls are routed to the I/G 150, which now controls the session.
In the case of the FTNs being different, the I/G 150 assigns a unique DID per case (i.e. Busy, No Answer etc.). This allows identification of the forward reason so that the correct FTN can be selected.

Early CF Flow

Figure 17:
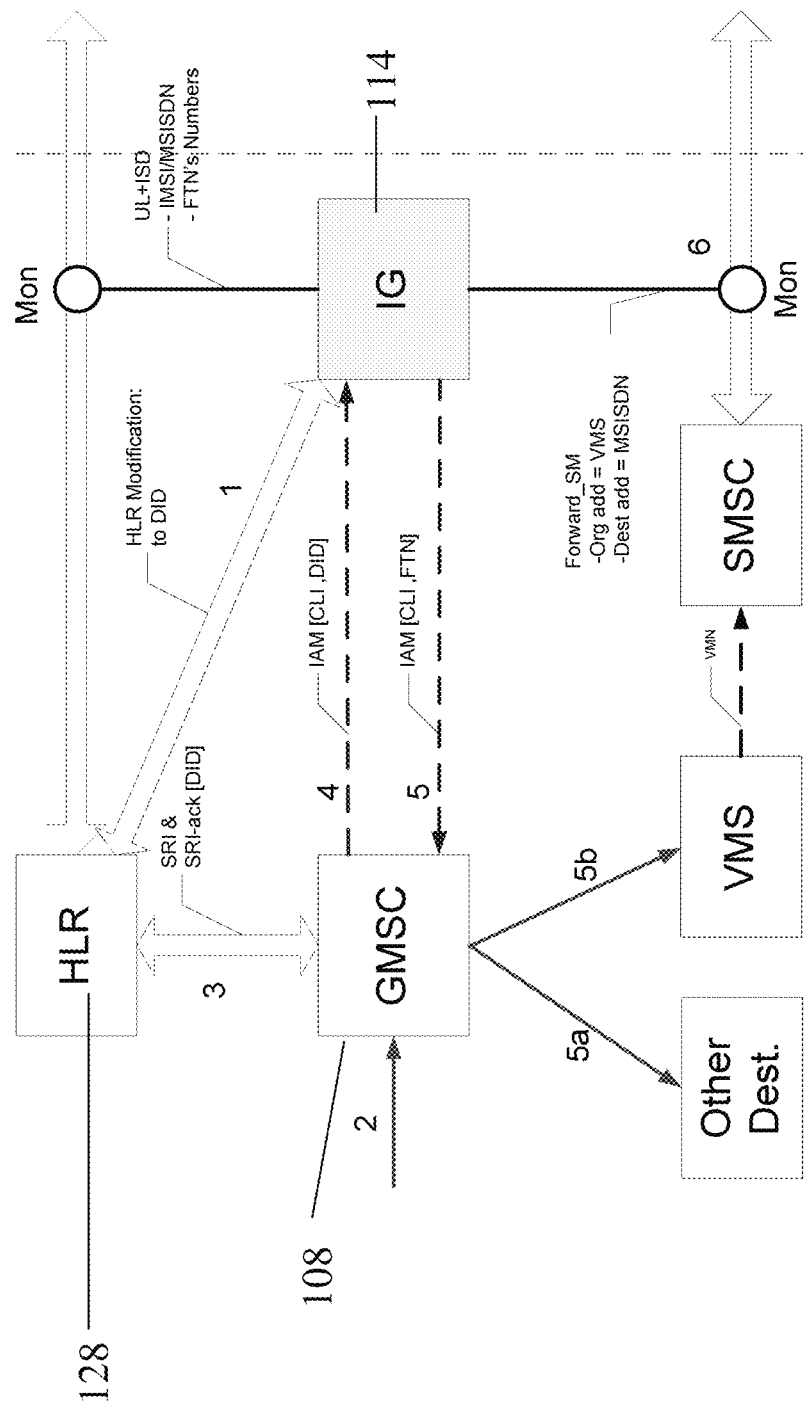
FIG. 17 illustrates signaling flow for the early forwarding cases.

Reference is now made to FIG. 17, which shows signaling flow for the early forwarding cases. The flow control is as described in table 11 below.

TABLE 11

| Early forwarding flow control | |
|---|---|
| Step 1 | The I/G changes the FTN addresses to DID |
| Step 2 | A mobile terminated (MT) call arrives to the GMSC. |
| Step 3 | The GMSC interrogates the HLR for routing information (MAP_SRI). The HLR return with DID |
| Step 4 | The GMSC sends IAM [CLI, DN = DID] to the I/G. |
| Step 5a | In case DID = other destination than VMS, the I/G connect the call and initiates MCN |
| Step 5b | In case DID = VMS the I/G connect the call and initiate timer |
| Step 6 | In case no MT SMS was submitted from the VMS as notification the I/G initiate MCN. |

Optimal Voicemail Deposit (OVMD) Alternative Solutions

There are two alternative technical solutions for the Optimal Voicemail Deposit, depending on the host network as explained above.
IN-based
ISUP-based (Service Node)
Following is a description of the two options.

Option 1

Intelligent Network

Based on IN architecture, the IntelliGate controls calls delivered to outbound roaming subscribers. This solution fits to networks that are already IN or CAMEL ready and/or networks that experience a relatively high outbound roaming traffic.

Using CS1 or CAP protocols, call control is performed using a combination of Trigger Detection Points and Event Detection points.

Option 2

ISUP

In particular cases, such as non-IN network environment and/or relatively low outbound roaming traffic; call control is performed using ISUP signaling. When a call is not completed—subscriber does not answer or is not available—the IntelliGate is triggered to directly route the call to the called party's voicemail system using only HMPN resources, along with the original called number, as if it were a local call in the home network.

Call control does not necessarily require connecting the IntelliGate to the network via voice channels. Rather signaling links are only required to convey the ISUP signaling. This inter-connection is achieved by utilizing a 'Loop-Back' technique on the MSC.

Deactivation of the Existing Forwarding

Alternatives

In some cases the technical solution must support deactivation of the existing forwarding settings of the outbound roamer as soon as he/she registers at a foreign VLR.

However, the operator may choose to either do the deactivation by itself (e.g. using an HLR script) or give up doing any such deactivation. The delivered solution is adapted to the decision taken.

Optimal Voicemail Deposit (OVMD) IN-Based Solution

Figure 18:
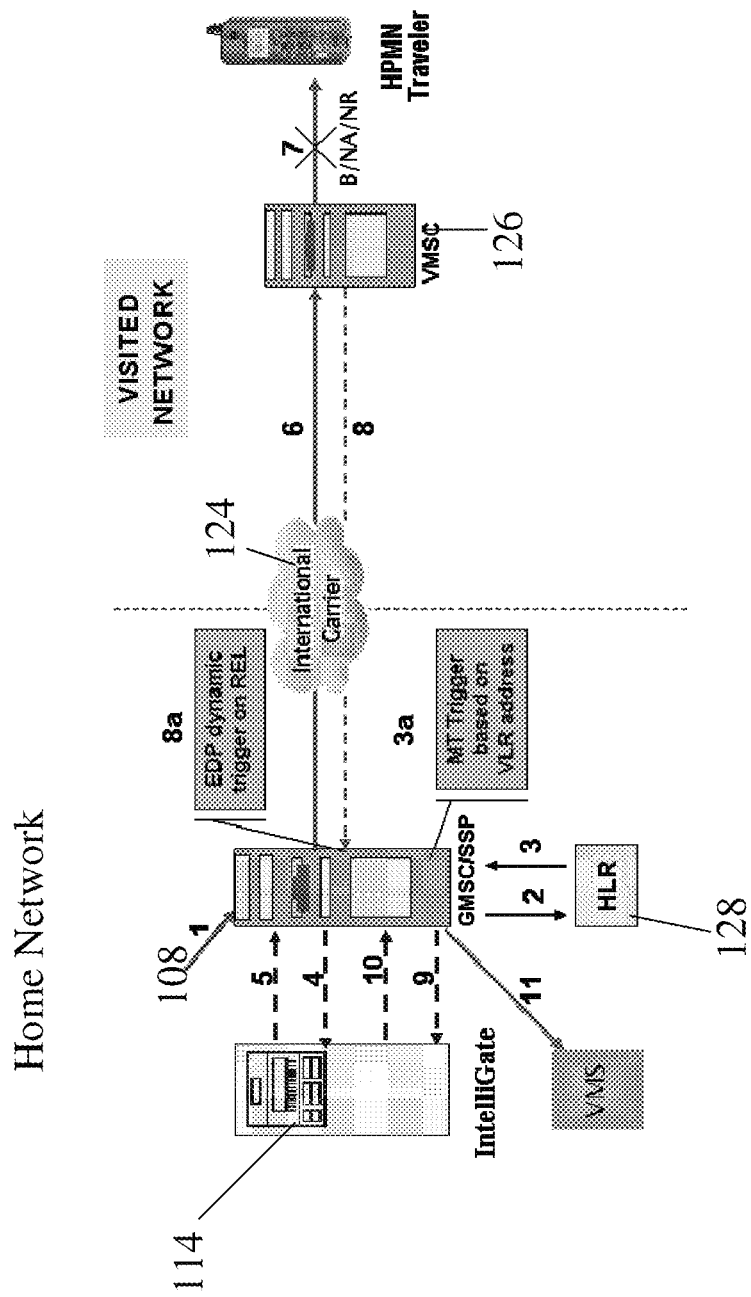
FIG. 18 illustrates call flow for a further preferred embodiment for Optimal VoiceMail Deposit based on an IN architecture.

Reference is now made to FIG. 18 which illustrates call flow for a further preferred embodiment for Optimal Voice-Mail Deposit based on an IN architecture. This part of the disclosure is related to the other OVMD embodiments listed above. The IN protocol can be CS-1 or CAP (for CAMEL enabled subscribers) as before. The procedure in FIG. 18 is as described in the following table 12.

TABLE 12

| Call flow for OVMD IN solution | |
|---|---|
| Step 1 | A mobile terminated (MT) call arrives at Operator GMSC 108. |
| Step 2 | GMSC 108 interrogates HLR 128 for routing information (MAP_SRI). |
| Steps 3, 3a | The HLR, after interrogating the serving VLR 126, returns a Mobile Subscriber Roaming Number (MSRN). |
| Step 4 | The foreign VLR-address fires a Trigger Detection Point causing GMSC 108 to send an IDP to IntelliGate 114 adding the CLI and MSRN. |
| Step 5 | The IntelliGate 114 processes the request and sends to the GMSC Connect [MSRN]. |
| Step 6 | The GMSC arms an Event Detection Point for the call and routes the call to the VPMN. |
| Step 7 | The VMSC attempts to route the call to the destination telephone. The call is not answered. |
| Steps 8, 8a | If forwarding is disabled the VMSC 126 releases the call. The REL message fires the Event Detection Point (EDP) at the operator's GMSC.<br>If forwarding is not deactivated in advance then the VMSC routes the call back to the operator's network, |

TABLE 12-continued

Call flow for OVMD IN solution

| | |
|---|---|
| | which fires a similar event DP and the forwarded call is dropped. |
| Step 9 | The GMSC sends the EDP query to the IntelliGate. |
| Step 10 | The IntelliGate processes the query and sends a Connect [VMS address, DN, CLI] message. |
| Step 11 | The GMSC routes the call to the VM system. |

Optimal Voicemail Deposit (OVMD) ISUP-Based Solution

Figure 19:
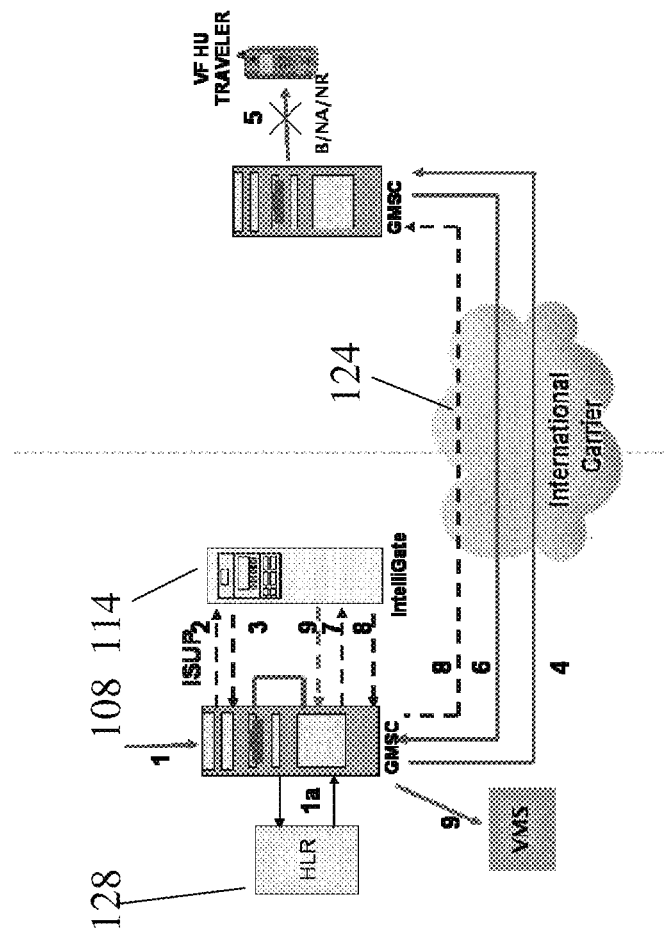
FIG. 19 depicts the call flow for the Optimal VM Deposit based on ISUP and 'Loop-Back' architecture.

Reference is now made to FIG. 19, which depicts the call flow for the Optimal VM Deposit based on ISUP and 'Loop-Back' architecture. The call flow is as shown in table 13 below, with the step numbers referring to the figure.

TABLE 13

Call flow for FIG. 19.

| | |
|---|---|
| Step 1 | A mobile terminated (MT) call arrives at the operator's-GMSC 108. |
| Step 1a | The GMSC interrogates HLR 128 for routing information (MAP_SRI). HLR 128 (after interrogating the serving VLR - not illustrated here), returns a Mobile Subscriber Roaming Number (MSRN). |
| Step 2 | The MSRN, which indicates a foreign VPMN, causes the GMSC to send IAM [CLI, DN = MSRN, ODN = MSISDN] to IntelliGate 114. |
| Step 3 | IntelliGate 114 processes the request and sends to the GMSC IAM [DN = MSRN] referring to the looped-back time-slot. |
| Step 4 | The GMSC routes the call to the VPMN. |
| Step 5 | The VMSC attempts to route the call to the destination telephone. The call is not answered. |
| Step 6 | As forwarding settings are NOT previously deactivated, the VMSC forwards the call back to operator by sending IAM [DN = VMS] |
| Step 7 | Based on the DN = VMS criterion, the GMSC performs one of the following alternative processing (operator's decision): Drops the call by a REL message to the international network. Routes the call to the IntelliGate by sending IAM [DN = VMS] to be dropped by the IntelliGate. |
| Step 8 | The IntelliGate opens a time-out equal to the NA time-out less 5 seconds to receive the forwarded call: On BUSY or NR conditions, the forwarded call arrives before the time-out expires. On NA condition the time-out expires before the forwarded call arrives. In both cases 'a' and 'b' the Intelligent Gateway drops the forwarded call by sending a REL message (unless dropped by the GMSC) |
| Step 9 | Due to dropping the forwarded call a REL message appears on the Step 3 call. As a result the IntelliGate sends an IAM [CLI, DN = VMS, ODN = MSISDN] referring to the same looped-back time-slot as in step 3. The GMSC routes the call to the VM system. Since leg 2 and leg 3 are looped-back, the caller gets direct access to the VMS. |

Using the generic MT (Mobile Terminated) control according to the above embodiments, it is possible to provide the following customized features as desired:

Caller pays for the MT leg—currently the called party pays for the international leg. With this service, the caller can be the one who pays.

Call screening—the ability for the roamer to screen the calls for him/her, based on various criteria, and using various means, for example:

PIN—only callers with a predetermined password will be able to reach the subscriber White list—only certain people are allowed to reach the subscriber Black list—don't allow specific callers to reach the subscriber Time of day—allow incoming calls only at specific hours, etc.

Specialized Unavailability Message

The present embodiments are able to analyze the return codes from the telephony call, and act accordingly, thus:

REL(Busy) after ACM: means the roamer has rejected the call→play prompt1

REL(No Answer) after ACM: means couldn't answer the phone/didn't hear the ring→play prompt2

REL after IAM: means unavailable/Early call forwarding→play prompt3

Domestic postpaid, Roaming prepaid—the subscriber can be a postpaid subscriber at the home network (like most of us), but a prepaid subscriber while at roaming!

Check current price/min, balance,

Expense limit alarms our platform will monitor the call, and alarm the roamer during the call if reaching a specific limit, or for every additional unit of time or cost.

It is expected that during the life of this patent many relevant cellular networking devices and systems will be developed and the scopes of the terms herein, particularly, but not exclusively of the terms "Intelligent Network" "ISUP", "Voicemail", "HLR", "VLR" "call forwarding", "roaming", "Intelligent Gateway", "probe", "SS7", "MSC", "GMSC" and "call forwarding", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for control of calls terminated without answering at a roaming user roaming on a network apart from a respective home network of said user, said home network generally connecting a call to said roaming user via an outgoing international leg to said roaming network, and using late call forwarding for routing the call to the voicemail of the roaming user if a call has not been answered by creating a return international leg from said roaming user to said home network, said home network having a roaming control node; the method comprising at the home network:

per user, deactivating late call forwarding at a home location register of said roaming user;

upon placement of a call to a roaming user:

identifying the call being placed to a roaming user;

arming a roaming user trigger for call release, the trigger to operate upon receipt of a call release signal from said network apart from a respective home network of said user, the call release signal indicating non-continuation of the call;

routing the call to the roaming network to reach the roaming user;

at the roaming control node detecting release of the call when unanswered, via said trigger for call release; and at the roaming control node, upon said call release detection, connecting the origin leg of said call locally to a voicemail of said roamer, thereby connecting a caller directly to said voicemail without creating either said outgoing international leg to the roamer or said return international call leg from said roamer.

2. The method of claim 1, further comprising returning a release cause.

3. The method of claim 1, further comprising modifying forwarding settings of given users by said deactivating when they are found to be roaming.

4. The method of claim 1, further comprising sending call details of said caller to said voicemail, said call details comprising caller identity information.

5. The method of claim 1, comprising, at said roaming control node carrying out said late call forwarding deactivation for a given user in said home location register when it is determined that said given user is roaming.

6. The method of claim 1, further comprising sending a text message to said roaming user, said text message including caller identity information.

7. A system for control of calls terminated without answering at a roaming user roaming on a network apart from a respective home network of said user, the home network generally using late call forwarding to connect a caller to a voicemail of said roaming user when said call is unanswered, said connecting comprising setting up an outgoing international call leg to said roaming user and a return international call leg from said roaming user; the system comprising at the home network a roaming control node and a home location register; and a switching node;

said home location register of said roaming user being configured to deactivate said late call forwarding;

said switching node being configured to notify the roaming control node of a call intended for a roaming user;

said roaming control node being configured to request a call release notification for said call;

said switching node being configured to forward said call to said roaming network to reach said roaming user and to arm a roaming call release trigger upon placement of said call for forwarding, said call release trigger being operable upon receipt of said call release notification from said network apart from a respective home network of said user, said call release notification indicating non-continuation of said call;

said switching node being configured to receive said call release notification when said call is unanswered at said roaming network, and to report said call release, through the call release trigger, to said roaming control node; and said roaming control node being configured to locally switch an origin leg of said call to a voicemail of said roamer, thereby connecting a caller to said voicemail without setting up either said outgoing international call leg or said return international call leg when said call is unanswered by said roaming user.

8. The system of claim 7, wherein said notification of disconnection further comprises a release cause.

9. The system of claim 7, further comprising a forwarding modification unit for modifying forwarding settings of given users when they are formed to be roaming.

10. The system of claim 7, further configured to send call details of said caller to said voicemail, said call details comprising caller identity information.

11. The system of claim 7, wherein said roaming control node is configured to carry out said late call forwarding deactivation at said home location register for a given user when it is determined that said given user is roaming.

12. The system of claim 7, further configured to send a text message to said roaming user, said text message including caller identity information.

13. A method for control of calls terminated without answering at a roaming user roaming on a roaming network apart from a respective home network of said user, the roaming call created with an outgoing international leg from said home network to said roaming network, said home network generally using late call forwarding for routing the call to the voicemail of the roaming user if a call has not been answered resulting in a return international leg from said roaming user to said voicemail, said home network having a roaming control node; the method comprising at the home network:

upon placement of a call to a roaming user:

identifying the call being placed to a roaming user;

arming a roaming user trigger for call release, the trigger to operate upon receipt of a call release signal from said network apart from a respective home network of said user, the call release signal indicating non-continuation of the call;

routing the call to the roaming network to reach the roaming user;

upon the call being unanswered, the call being forwarded to the forward-to-number;

at the home network, verifying that the forward-to number of the forwarded call is a voicemail deposit number and if so, then handing control for the forwarded call over to the roaming control node at said roaming control node, releasing the call, causing a release of the return and outward international legs of said call, said releasing the call causing operation of said roaming call trigger for call release, said operation as a result of said arming;

receiving said roaming call trigger for call release at said roaming control node, retrieving the forward to number which is the voicemail deposit destination and connecting the caller locally to the voicemail deposit destination.

14. Apparatus for control of calls terminated without answering at a roaming user roaming on a roaming network apart from a respective home network of said user, the roaming call created with an outgoing international leg from said home network to said roaming network, said home network generally using late call forwarding for routing the call to the voicemail of the roaming user if a call has not been answered resulting in a return international leg from said roaming user to said voicemail, said home network having a roaming control node; the apparatus located at the home network and comprising a switching node and a roaming control node:

the switching node configured to identify the call being placed to a roaming user, and to arm a roaming user trigger for call release, the trigger to operate upon receipt of a call release signal from said network apart from a respective home network of said user, the call release signal indicating non-continuation of the call;

the switching node further configured to route the call to the roaming network to reach the roaming user;

the switching node being configured to verify that the forward-to number of the forwarded call is a voicemail deposit number and if so, then to hand control for the forwarded call over to the roaming control node, the roaming control node configured to release the call, causing a release of the return and outward international legs of said call, and causing operation of said roaming call trigger for call release, said operation as a result of said arming;

the roaming control node further configured to receive said roaming call trigger for call release, to retrieve the forward to number which is a voicemail deposit destination and to connect the caller locally to the voicemail deposit destination.

* * * * *